(12) United States Patent
Lee et al.

(10) Patent No.: US 12,470,326 B2
(45) Date of Patent: Nov. 11, 2025

(54) METHOD, SENDER, PROCESSING DEVICE, AND STORAGE MEDIUM FOR TRANSMITTING DATA IN SEMANTIC-BASED WIRELESS COMMUNICATION SYSTEM, AND METHOD, RECEIVER, AND STORAGE MEDIUM FOR RECEIVING DATA

(71) Applicant: LG ELECTRONICS INC., Seoul (KR)

(72) Inventors: Kyungho Lee, Seoul (KR); Sangrim Lee, Seoul (KR); Ikjoo Jung, Seoul (KR); Hojae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/712,657

(22) PCT Filed: Nov. 23, 2021

(86) PCT No.: PCT/KR2021/017273
§ 371 (c)(1),
(2) Date: May 22, 2024

(87) PCT Pub. No.: WO2023/095932
PCT Pub. Date: Jun. 1, 2023

(65) Prior Publication Data
US 2025/0015929 A1    Jan. 9, 2025

(51) Int. Cl.
*H04L 1/1607*    (2023.01)
(52) U.S. Cl.
CPC ............................... *H04L 1/1607* (2013.01)

(58) Field of Classification Search
CPC ..................................................... H04L 1/1607
See application file for complete search history.

(56) References Cited

U.S. PATENT DOCUMENTS 6,728,672 B1 *  4/2004  Will ...................... G10L 25/69
                                                      704/270.1

FOREIGN PATENT DOCUMENTS

| CN | 112800247 | 6/2021 |
| CN | 113452811 | 9/2021 |

OTHER PUBLICATIONS

PCT International Application No. PCT/KR2021/017273, Written Opinion and International Search Report dated Aug. 17, 2022, 7 pages.

(Continued)

*Primary Examiner* — Joseph D Torres
(74) *Attorney, Agent, or Firm* — LEE, HONG, DEGERMAN, KANG & WAIMEY

(57) ABSTRACT

A sender may: decompose, on the basis of a plurality of semantic elements, data into semantic element values respectively corresponding to the plurality of semantic elements; perform a first transmission including some semantic element values from among the semantic element values; and on the basis of receiving a retransmission request for the first transmission from a receiver, perform a retransmission including at least one semantic element value other than the semantic element values included in the first transmission, from among the plurality of semantic element values.

11 Claims, 15 Drawing Sheets

(56) References Cited

OTHER PUBLICATIONS

Weng et al., "Semantic Communication Systems for Speech Transmission," IEEE Journal on Selected Areas in Communications, vol. 39, Issue 8, Aug. 2021, 13 pages.

Jiang et al.,, "Deep Source-Channel Coding for Sentence Semantic Transmission with HARQ," IEEE Transactions on Communications 2022, Jun. 2021, 31 pages.

Xie et al., "Deep Learning Enabled Semantic Communication Systems," IEEE Transactions on Signal Processing, vol. 69, 07, Apr. 2021, 15 pages.

\* cited by examiner

METHOD, SENDER, PROCESSING DEVICE, AND STORAGE MEDIUM FOR TRANSMITTING DATA IN SEMANTIC-BASED WIRELESS COMMUNICATION SYSTEM, AND METHOD, RECEIVER, AND STORAGE MEDIUM FOR RECEIVING DATA

CROSS-REFERENCE TO RELATED APPLICATION(S)

This application is the National Stage filing under 35 U.S.C. 371 of International Application No. PCT/KR2021/017273, filed on Nov. 23, 2021, the contents of which are all incorporated by reference herein in its entirety.

TECHNICAL FIELD

The present disclosure relates to a wireless communication system.

BACKGROUND

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at anytime and anywhere by connecting a plurality of devices and objects to each other is one main issue to be considered in next-generation (e.g., 5G) communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

While 5G communication is still under development, there is an increasing demand for higher data rates to accommodate new services such as virtual reality and autonomous driving.

SUMMARY

As new radio communication technology has been introduced, the number of UEs to which a BS should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

There is a need for a method of efficiently performing semantic communication.

The objects to be achieved with the present disclosure are not limited to what has been particularly described hereinabove and other objects not described herein will be more clearly understood by persons skilled in the art from the following detailed description.

According to an aspect of the present disclosure, provided is a method of transmitting data by a transmitting device in a semantic-based wireless communication system. The method includes decomposing the data into semantic element values respectively corresponding to a plurality of semantic elements based on the plurality of semantic elements, performing first transmission including some semantic element values from among the semantic element values, and performing retransmission including at least one semantic element value other than the semantic element values provided in the first transmission from among the plurality of semantic element values based on reception of a retransmission request for the first transmission from a receiving device.

According to another aspect of the present disclosure, provided is a transmitting device for transmitting data in a semantic-based wireless communication system. The transmitting device includes at least one transceiver, at least one processor, and at least one computer memory operably connected to the at least one processor and configured to store instructions that, when executed, cause the at least one processor to perform operations. The operations include decomposing the data into semantic element values respectively corresponding to a plurality of semantic elements based on the plurality of semantic elements, performing first transmission including some semantic element values from among the semantic element values, and performing retransmission including at least one semantic element value other than the semantic element values provided in the first transmission from among the plurality of semantic element values based on reception of a retransmission request for the first transmission from a receiving device.

According to another aspect of the present disclosure, provided is a processing device for a transmitting device. The processing device includes at least one processor, and at least one computer memory operably connected to the at least one processor and configured to store instructions that, when executed, cause the at least one processor to perform operations. The operations include decomposing data into semantic element values respectively corresponding to a plurality of semantic elements based on the plurality of semantic elements, performing first transmission including some semantic element values from among the semantic element values, and performing retransmission including at least one semantic element value other than the semantic element values provided in the first transmission from among the plurality of semantic element values based on reception of a retransmission request for the first transmission from a receiving device.

According to another aspect of the present disclosure, provided is a computer-readable storage medium. The storage medium stores at least one program code including instructions that, when executed by at least one processor, cause the at least one processor to perform operations. The operations include decomposing data into semantic element values respectively corresponding to a plurality of semantic elements based on the plurality of semantic elements, performing first transmission including some semantic element values from among the semantic element values, and performing retransmission including at least one semantic element value other than the semantic element values provided in the first transmission from among the plurality of semantic element values based on reception of a retransmission request for the first transmission from a receiving device.

According to another aspect of the present disclosure, provided is a method of receiving data by a receiving device in a semantic-based wireless communication system. The method includes receiving, from a transmitting device, first transmission including semantic element values for some semantic elements from among a plurality of semantic elements, composing semantic data based on the semantic element values provided in the first transmission, calculating semantic correctness for the composed semantic data, transmitting a retransmission request for the first transmission based on the semantic correctness lower than a threshold, and receiving retransmission including a semantic element value for at least one semantic element other than the some semantic elements.

According to another aspect of the present disclosure, provided is a receiving device for receiving data in a semantic-based wireless communication system. The receiving device includes at least one transceiver, at least one processor, and at least one computer memory operably connected to the at least one processor and configured to store instructions that, when executed, cause the at least one processor to perform operations. The operations include receiving, from a transmitting device, first transmission including semantic element values for some semantic elements from among a plurality of semantic elements, composing semantic data based on the semantic element values provided in the first transmission, calculating semantic correctness for the composed semantic data, transmitting a retransmission request for the first transmission based on the semantic correctness lower than a threshold, and receiving retransmission including a semantic element value for at least one semantic element other than the some semantic elements.

According to another aspect of the present disclosure, provided is a computer-readable storage medium. The storage medium stores at least one program code including instructions that, when executed by at least one processor, cause the at least one processor to perform operations. The operations include receiving, from a transmitting device, first transmission including semantic element values for some semantic elements from among a plurality of semantic elements, composing semantic data based on the semantic element values provided in the first transmission, calculating semantic correctness for the composed semantic data, transmitting a retransmission request for the first transmission based on the semantic correctness lower than a threshold, and receiving retransmission including a semantic element value for at least one semantic element other than the some semantic elements.

According to another aspect of the present disclosure, the retransmission request may include information requesting the at least one semantic element value.

According to each aspect of the present disclosure, the retransmission request may include information regarding a channel for the retransmission.

According to each aspect of the present disclosure, the transmitting device may include a semantic decomposition layer, and the decomposing of the data into the semantic element values may be performed by the semantic decomposition layer.

According to each aspect of the present disclosure, the receiving device may include a semantic composition layer. The semantic data may be composed by the semantic composition layer.

According to each aspect of the present disclosure, the receiving device and the transmitting device may negotiate the plurality of semantic elements.

The foregoing solutions are merely a part of the examples of the present disclosure and various examples into which the technical features of the present disclosure are incorporated may be derived and understood by persons skilled in the art from the following detailed description.

According to implementations of the present disclosure, a wireless communication signal may be efficiently transmitted/received. Accordingly, the overall throughput of a wireless communication system may be improved.

According to implementations of the present disclosure, a wireless communication system may efficiently support various services with different requirements.

According to implementations of the present disclosure, delay/latency occurring during wireless communication between communication devices may be reduced.

According to implementations of the present disclosure, semantic communication may be efficiently performed.

The effects according to the present disclosure are not limited to what has been particularly described hereinabove and other effects not described herein will be more clearly understood by persons skilled in the art related to the present disclosure from the following detailed description.

BRIEF DESCRIPTION OF THE DRAWINGS

The accompanying drawings, which are included to provide a further understanding of the present disclosure, illustrate examples of implementations of the present disclosure and together with the detailed description serve to explain implementations of the present disclosure.

DETAILED DESCRIPTION

Figure 1:
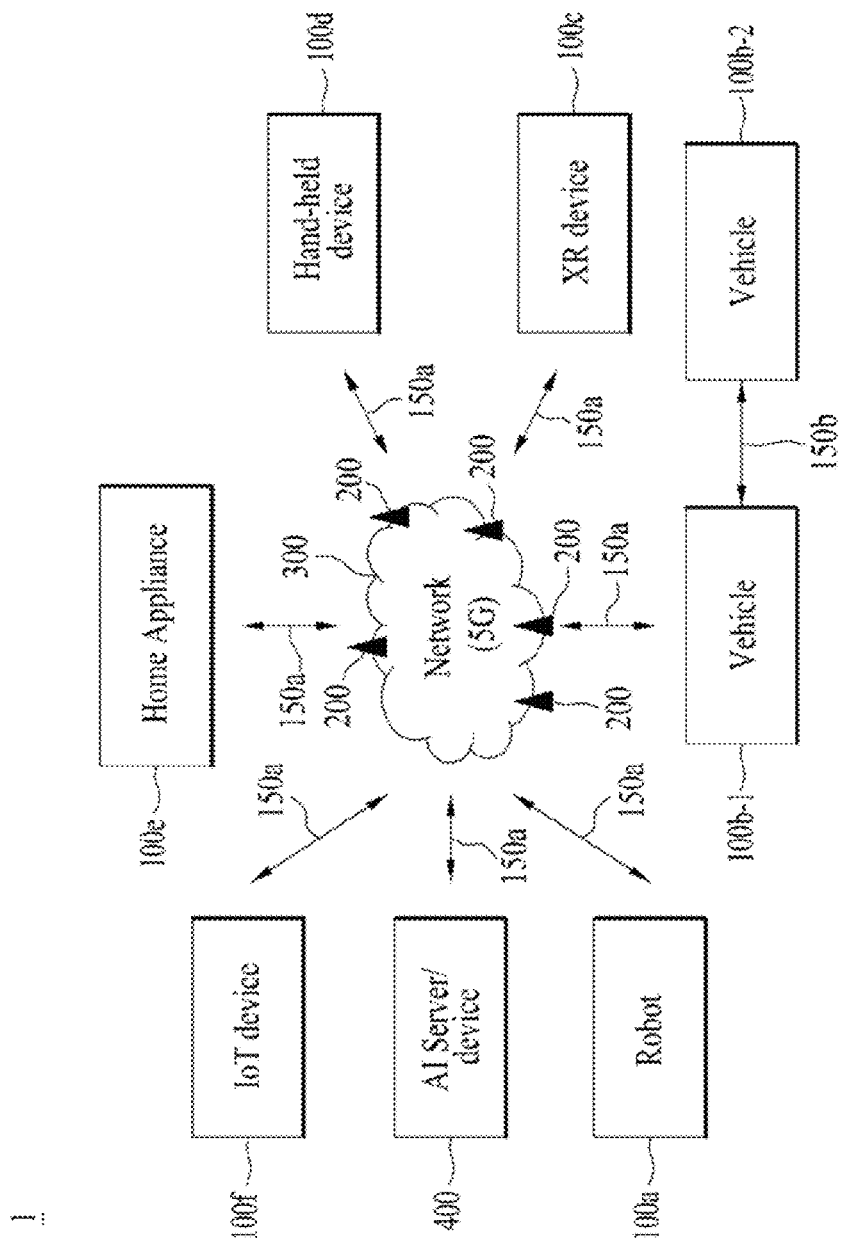
FIG. 1 illustrates an example of a communication system 1 to which implementations of the present disclosure are applied.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP based standard specifications, for example, 3GPP TS 36.211, 3GPP TS 36.212, 3GPP TS 36.213, 3GPP TS 36.321, 3GPP TS 36.300, 3GPP TS 36.331, 3GPP TS 37.213, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, the term user is used to refer to a UE. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a transmission and reception point (TRP) refers to a fixed point capable of transmitting/receiving a radio signal to/from a UE by communication with the UE. Various types of BSs may be used as TRPs regardless of the names thereof. For example, a BS, NB, eNB, pico-cell eNB (PeNB), home eNB (HeNB), relay, repeater, etc. may be a TRP. Furthermore, a TRP may not be a BS. For example, a radio remote head (RRH) or a radio remote unit (RRU) may be a TRP. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per TRP. An antenna may refer to a physical antenna port or refer to a virtual antenna or an antenna group. The TRP may also be called a point.

In the present disclosure, a cell refers to a specific geographical area in which one or more TRPs provide communication services. Accordingly, in the present disclosure, communication with a specific cell may mean communication with a BS or a TRP providing communication services to the specific cell. A DL/UL signal of the specific cell refers to a DL/UL signal from/to the BS or the TRP providing communication services to the specific cell. A cell providing UL/DL communication services to a UE is especially called a serving cell. Furthermore, channel status/quality of the specific cell refers to channel status/quality of a channel or a communication link generated between the BS or the TRP providing communication services to the specific cell and the UE. In 3GPP-based communication systems, the UE may measure a DL channel state from a specific TRP using cell-specific reference signal(s) (CRS(s)) transmitted on a CRS resource and/or channel state information reference signal(s) (CSI-RS(s)) transmitted on a CSI-RS resource, allocated to the specific TRP by antenna port(s) of the specific TRP.

A 3GPP-based communication system uses the concept of a cell in order to manage radio resources, and a cell related with the radio resources is distinguished from a cell of a geographic area.

The "cell" of the geographic area may be understood as coverage within which a TRP may provide services using a carrier, and the "cell" of the radio resources is associated with bandwidth (BW), which is a frequency range configured by the carrier. Since DL coverage, which is a range within which the TRP is capable of transmitting a valid signal, and UL coverage, which is a range within which the TRP is capable of receiving the valid signal from the UE, depend upon a carrier carrying the signal, coverage of the TRP may also be associated with coverage of the "cell" of radio resources used by the TRP. Accordingly, the term "cell" may be used to indicate service coverage by the TRP sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. In this case, the carrier frequency may be equal to or different from a center frequency of each cell or CC.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PCFICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, the PDCCH refers to a set of time-frequency resources (e.g., a set of resource elements (REs)) that carry downlink control information (DCI), and the PDSCH refers to a set of time-frequency resources (e.g., a set of REs) that carry DL data. The PUCCH, PUSCH, and PRACH refer to a set of time-frequency resources (i.e., a set of REs) that carry uplink control information (UCI), UL data, and random access signals, respectively. In the following description, the meaning of "The UE transmits/receives the PUCCH/PUSCH/PRACH" is that the UE transmits/receives the UCI/UL data/random access signals on or through the PUCCH/PUSCH/PRACH, respectively. In addition, the meaning of "the BS transmits/receives the PBCH/PDCCH/PDSCH" is that the BS transmits the broadcast information/DCI/DL data on or through a PBCH/PDCCH/PDSCH, respectively.

In the present disclosure, a radio resource (e.g., a time-frequency resource) scheduled or configured for the UE by the BS for transmission or reception of PUCCH/PUSCH/PDSCH is also referred to as a PUCCH/PUSCH/PDSCH resource.

Since a communication device receives an SS/PBCH resource block (SSB), DMRS, CSI-RS, PBCH, PDCCH, PDSCH, PUSCH, and/or PUCCH in the form of radio signals on a cell, the communication device may not select and receive radio signals including only a specific physical channel or a specific physical signal through a radio frequency (RF) receiver, or may not select and receive radio signals without a specific physical channel or a specific physical signal through the RF receiver. In actual operations, the communication device receives radio signals on the cell via the RF receiver, converts the radio signals, which are RF band signals, into baseband signals, and then decodes physical signals and/or physical channels in the baseband signals using one or more processors. Thus, in some implementations of the present disclosure, reception of physical signals and/or physical channels may mean that a communication device does not attempt to restore the physical signals and/or physical channels from radio signals, for example, does not attempt to decode the physical signals and/or physical channels, rather than that the communication device does not actually receive the radio signals including the corresponding physical signals and/or physical channels.

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using radio access technology (RAT) (e.g., 5G New RAT (NR) or LTE (e.g., E-UTRA), 6G) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of Things (IoT) device 100f, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless may operate as a BS/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network or 6G network to be introduced in the future. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f and the BSs 200 and between the wireless devices 100a to 100f). Here, the wireless communication/connections such as UL/DL communication 150a and sidelink communication 150b (or, device-to-device (D2D) communication) may be established by various RATs. The wireless devices and the BSs/wireless devices may transmit/receive radio signals to/from each other through the wireless communication/connections 150a and 150b. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
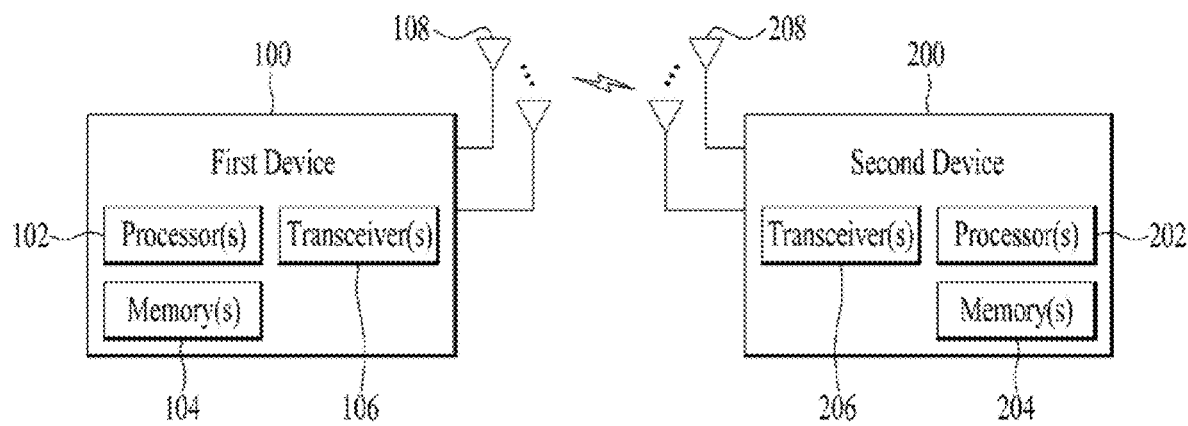
FIG. 2 is a block diagram illustrating examples of communication devices capable of performing a method according to the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs. Here, {the first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the below-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the below-described/proposed procedures and/or methods. Here, the processor(s) 102 and the memory(s) 104 may be a part of a communication modem/circuit/chip designed to implement wireless communication technology. The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the afore/below-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202.

For example, the memory(s) 204 may perform a part or all of processes controlled by the processor(s) 202 or store software code including instructions for performing the afore/below-described/proposed procedures and/or methods. Here, the processor(s) 202 and the memory(s) 204 may be a part of a communication modem/circuit/chip designed to implement wireless communication technology. The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

The wireless communication technology implemented in the wireless devices 100 and 200 of the present disclosure may include narrowband Internet of Things for low-power communication as well as LTE, NR, and 6G communications. For example, NB-IoT technology may be an example of Low Power Wide Area Network (LPWAN) technology, and may be implemented by, but is limited to, standards such as LTE Cat NB1 and/or LTE Cat NB2. Additionally or alternatively, the wireless communication technology implemented in the wireless devices XXX and YYY of the present disclosure may perform communication based on the LTE-M technology. For example, the LTE-M technology may be an example of the LPWAN technology, and may be called by various names such as enhanced machine type communication (eMTC). For example, the LTE-M technology may be implemented by, but is not limited to, at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M. Additionally or alternatively, the wireless communication technology implemented in the wireless devices XXX and YYY of the present disclosure may include, but is not limited to, at least one of ZigBee, Bluetooth, and Low Power Wide Area Network (LPWAN) considering low-power communication. For example, the ZigBee technology may create personal area networks (PAN) related to small/low-power digital communications based on various standards such as IEEE 802.15.4, and may be called by various names.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in the present disclosure. The one or more processors 102 and 202 may generate messages, control information, data, or information according to the functions, procedures, proposals, and/or methods disclosed in the present disclosure. The one or more processors 102 and 202 may generate signals (e.g., baseband signals) including PDUs, SDUs, messages, control information, data, or information according to the functions, procedures, proposals, and/or methods disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in the present disclosure may be implemented using firmware or software, and the firmware or software may be configured to include the modules, procedures, or functions. Firmware or software configured to perform the functions, procedures, proposals, and/or methods disclosed in the present disclosure may be included in the one or more processors 102 and 202 or stored in the one or more memories 104 and 204 so as to be driven by the one or more processors 102 and 202. The functions, procedures, proposals, and/or methods disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of the present disclosure, to one or more other devices. The one or more transceivers 106 and 206 may receive user data, control information, and/or radio signals/channels, mentioned in the functions, procedures, proposals, methods, and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in the present disclosure, through the one or more antennas 108 and 208. In the present disclosure, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
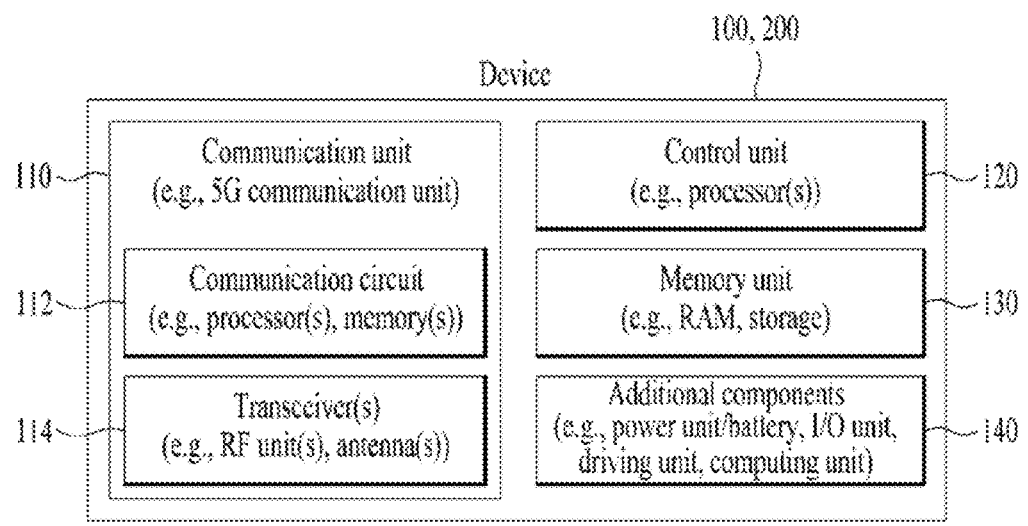
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a transitory memory, a non-transitory memory, and/or a combination thereof.

In the present disclosure, the at least one memory (e.g., 104 or 204) may store instructions or programs, and the instructions or programs may cause, when executed, at least one processor operably connected to the at least one memory to perform operations according to some embodiments or implementations of the present disclosure.

In the present disclosure, a computer readable (non-transitory) storage medium may store at least one instruction or program, and the at least one instruction or program may cause, when executed by at least one processor, the at least one processor to perform operations according to some embodiments or implementations of the present disclosure.

In the present disclosure, a processing device or apparatus may include at least one processor, and at least one computer memory operably connected to the at least one processor. The at least one computer memory may store instructions or programs, and the instructions or programs may cause, when executed, the at least one processor operably connected to the at least one memory to perform operations according to some embodiments or implementations of the present disclosure.

In the present disclosure, a computer program may include program code stored on at least one computer-readable (non-transitory) storage medium and, when executed, configured to perform operations according to some implementations of the present disclosure or cause at least one processor to perform the operations according to some implementations of the present disclosure. The computer program may be provided in the form of a computer program product. The computer program product may include at least one computer-readable (non-transitory) storage medium A communication device of the present disclosure includes at least one processor; and at least one computer memory operably connected to the at least one processor and configured to store instructions for causing, when executed, the at least one processor to perform operations according to example(s) of the present disclosure described later.

Wireless communication systems are extensively deployed to provide various types of communication services such as voice and data. The demand for higher data rates is increasing to accommodate incoming new services and/or scenarios where the virtual and real worlds blend. To address these ever-growing demands, new communication technologies beyond 5G are required. New communication technologies beyond 6G systems (hereinafter referred to as 6G) aim to achieve (i) extremely high data speeds per device, (ii) very large number of connected devices, (iii) global connectivity, (iv) ultra-low latency, (v) reducing energy consumption of battery-free IoT devices, (vi) ultra-reliable connections, (vii) connected intelligence with machine learning capabilities. In the 6G system, the following technologies are being considered: artificial intelligence (AI), terahertz (THz) communication, optical wireless communication (OWC), free space optics (FSO) backhaul network, massive multiple-input multiple-output (MIMO) technology, blockchain, three-dimensional (3D) networking, quantum communication, unmanned aerial vehicle (UAV), cell-free communication, integration of wireless information and energy transmission, integration of sensing and communication, integration of access backhaul networks, hologram beamforming, big data analysis, large intelligent surface (LIS), and so on.

In particular, there has been a rapid increase in attempts to integrate AI into communication systems. Methods being attempted in relation to AI may be broadly categorized into two: AI for communications (AI4C), which uses AI to enhance communication performance, and communications for AI (C4AI), which develops communication technologies to support AI. In the AI4C field, designs have been attempted to replace the roles of channel encoders/decoders, modulators/demodulators, or channel equalizers with end-to-end autoencoders or neural networks. In the C4AI field, as one type of distributed learning, federated learning involves updating a common prediction model by sharing only the weights and gradients of models with the server without sharing device raw data while protecting privacy.

Introducing AI into communications may simplify and enhance real-time data transmission. AI may use numerous analytics to determine a method of performing complex target tasks. In other words, AI may increase efficiency and reduce processing delays.

Time-consuming tasks such as handover, network selection, and resource scheduling may be instantly performed using AI. AI may also play a significant role in machine-to-machine, machine-to-human, and human-to-machine communications. AI-based communication systems may be supported by meta-materials, intelligent architectures, intelligent networks, intelligent devices, intelligence cognitive radio, self-sustaining wireless networks, and machine learning.

Recent attempts to integrate AI into wireless communication systems have primarily focused on the application layer, network layer, and particularly on wireless resource management and allocation. However, research into integrating AI into wireless communication systems is increasingly evolving towards the MAC layer and the physical layer. In particular, there are emerging attempts to combine deep learning with wireless transmission at the physical layer. AI-based physical layer transmission refers to applying signal processing and communication mechanisms based on AI drivers rather than traditional communication frameworks in fundamental signal processing and communication mechanisms. For example, the AI-based physical layer transmission may include deep learning-based channel coding and decoding, deep learning-based signal estimation and detection, deep learning-based MIMO mechanisms, AI-based resource scheduling and allocation, and the like.

Machine learning may be used for channel estimation and channel tracking. Machine learning can be used for power allocation, interference cancellation, etc. in the DL physical layer. Machine learning may also be used in MIMO systems for antenna selection, power control, and symbol detection.

However, applying deep neural networks for transmission at the physical layer may have the following issues.

Deep learning-based AI algorithms require a large amount of training data to optimize training parameters. However, due to limitations in acquiring data from specific channel environments, a significant amount of training data is often used offline. Static training of training data in specific channel environments may lead to contradictions between the dynamic features and diversity of wireless channels.

Furthermore, current deep learning primarily targets real signals. However, signals at the physical layer of wireless communication are complex signals. More research is needed on neural networks for detecting complex-domain signals to match the characteristics of wireless communication signals.

Hereinafter, machine learning will be described in detail.

Machine learning refers to a series of operations for training machines to perform tasks that are difficult to be performed by human. Machine learning requires data and learning models. In machine learning, data learning methods may be broadly categorized into three types: supervised learning, unsupervised learning, and reinforcement learning.

Neural network learning aims to minimize errors in outputs. Neural network learning refers to a process of repeatedly inputting training data to a neural network, calculating the error of the output and target of the neural network for the training data, backpropagating the error of the neural network from the output layer of the neural network to the input layer to reduce the error, and updating the weight of each node of the neural network.

Supervised learning may use training data labeled with a correct answer, whereas unsupervised learning may use training data that is not labeled with a correct answer. For example, in the case of supervised learning for data classification, training data may be labeled with each category. The labeled training data may be input to the neural network, and the output (category) of the neural network may be compared with the label of the training data, thereby calculating the error. The calculated error may be backpropagated through the neural network in reverse (that is, from the output layer to the input layer), and the connection weight(s) of each node of each layer of the neural network may be updated based on the backpropagation. Changes in the updated connection weight(s) of each node may be determined based on the learning rate. The calculation of the neural network for input data and the backpropagation of the error may configure a learning epoch. The learning data may be applied differently depending on the number of repetitions of the learning epoch of the neural network. For example, in the early phase of learning of the neural network, a high learning rate may be used to increase efficiency such that the neural network rapidly ensures a certain level of performance, but in the late phase of learning, a low learning rate may be used to increase accuracy.

The learning method may vary depending on the feature of data. For example, learning may be performed based on supervised learning rather than unsupervised learning or reinforcement learning to allow a receiver to accurately predict data transmitted from a transmitter in a communication system.

The learning model corresponds to the human brain. To this end, the most basic linear model may be considered. However, a machine learning paradigm that uses highly complex neural network structures such as artificial neural networks as learning models is referred to as deep learning.

Neural network cores used for learning may be broadly categorized into a deep neural network (DNN), a convolutional deep neural network (CNN), and a recurrent neural machine (RNN).

Figure 4:
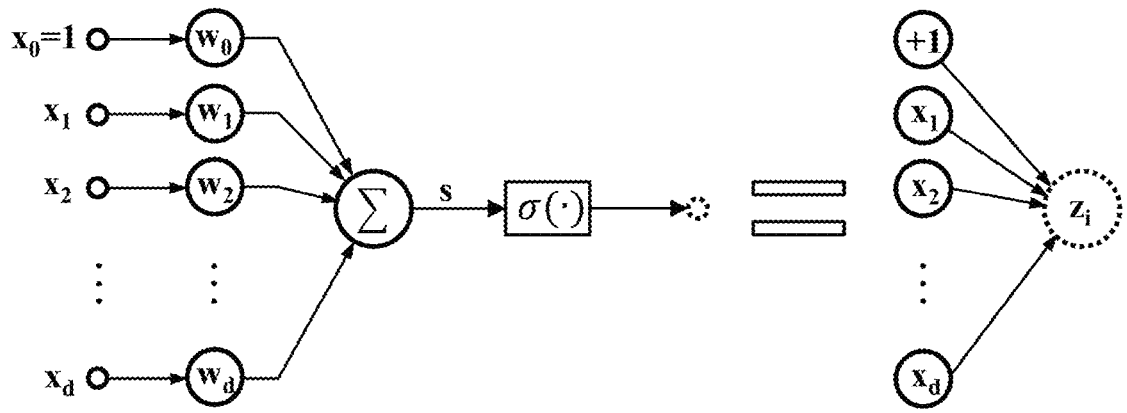
FIG. 4 illustrates a perceptron structure used in an artificial neural network.

FIG. 4 illustrates a perceptron structure used in an artificial neural network.

An artificial neural network may be implemented by connecting multiple perceptrons. Referring to FIG. 4, a process of receiving an input vector of $x=(x_1, x_2, \ldots, x_d)$, multiplying each component by a weight of $w=(w_1, w_2, \ldots, w_d)$, summing up the results, and then applying an activation function of $\sigma(\cdot)$ is referred to as a perceptron. For a large artificial neural network structure, the simplified perceptron structure shown in FIG. 14 may be extended. For a large artificial neural network structure, the simplified perceptron structure shown in FIG. 4 may be extended and applied to a multi-dimensional perceptron with different input vectors.

Figure 5:
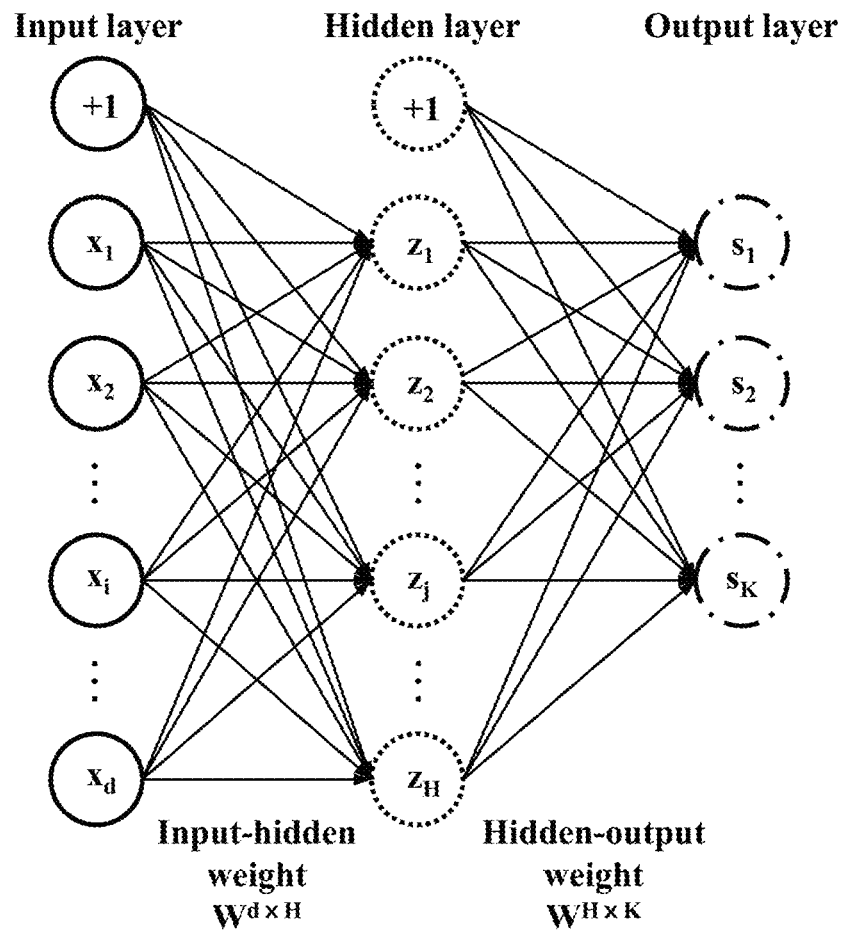
FIG. 5 illustrates a multilayer perceptron structure.

FIG. 5 illustrates a multilayer perceptron structure.

The perceptron structure shown in FIG. 4 may be extended to a multilayer perceptron structure having a total of three layers based on input and output values. An artificial neural network having H perceptrons of (d+1) dimensions between the first and second layers and K perceptrons of (H+1) dimensions between the second and third layers may be represented by the multilayer perceptron structure shown in FIG. 5.

A layer where input vectors are located is called an input layer, a layer where final output value(s) are located is called an output layer, and all layers between the input and output layers are referred to as hidden layers. In the example of FIG. 5, three layers are illustrated. However, since the actual number of layers in an artificial neural network is counted excluding the input layer, the artificial neural network based on the multilayer perceptron structure in FIG. 5 may be considered as having two layers. An artificial neural network is constructed by two-dimensionally connecting perceptrons of basic blocks.

In a neural network, layers are composed of small individual units called neurons. In the neural network, neurons receive inputs from other neurons, perform processing, and produce outputs. A region within the previous layer where each neuron receives inputs is called a receptive field. Each neuron computes output values by applying a specific function to input values received from the receptive field within the previous layer. The specific function applied to the input values is determined by i) a vector of weights and ii) biases. Learning in the neural network is performed based on iterative adjustment of the biases and weights. The vector of weights and the biases are called filters, which represent particular features of the input.

The aforementioned input layer, hidden layer, and output layer may be commonly applied not only to the multilayer perceptron structure but also to various artificial neural network structures such as CNNs, which will be discussed later. As the number of hidden layers increases, the artificial neural network becomes deeper, and the machine learning paradigm that uses sufficiently deep artificial neural networks as learning models is called deep learning. In addition, an artificial neural network used for deep learning are called DNNs.

The aforementioned multilayer perceptron structure is referred to as a fully-connected neural network. In the fully-connected neural network, there are no connections between neurons within the same layer, and connections exist only between neurons in adjacent layers. A DNN, which has the fully-connected neural network structure, includes multiple hidden layers and combinations of activation functions, and thus the DNN may be effectively applied to capture the characteristics of correlation between inputs and outputs. Here, the correlation characteristic may mean the joint probability of inputs and outputs.

On the other hand, various artificial neural network structures distinct from the DNN may be formed depending on how multiple perceptrons are connected to each other.

Figure 6:
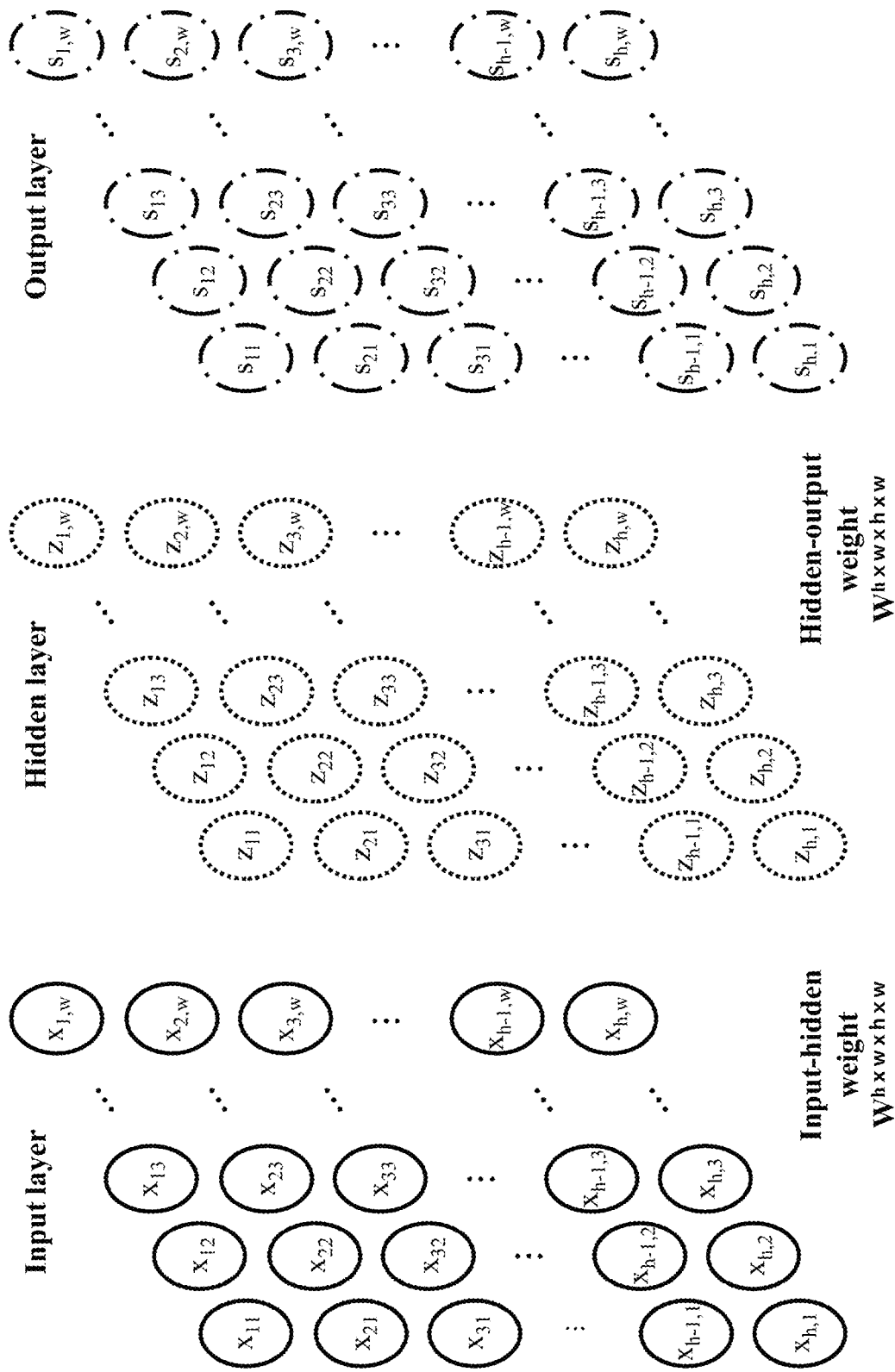
FIG. 6 illustrates the structure of a convolutional neural network (CNN)

FIG. 6 illustrates the structure of a CNN.

In a DNN, neurons within a layer are arranged in a one-dimensional manner. However, referring to FIG. 6, in the CNN, neurons may be assumed to be arranged in a two-dimensional manner, with w neurons horizontally and h neurons vertically. In this case, since a weight is added for each connection from a single input neuron to hidden layers, a total of h×w weights need to be considered. Since there are h×w neurons in input layers, a total of $h^2w^2$ weights are required between two adjacent layers.

Figure 7:
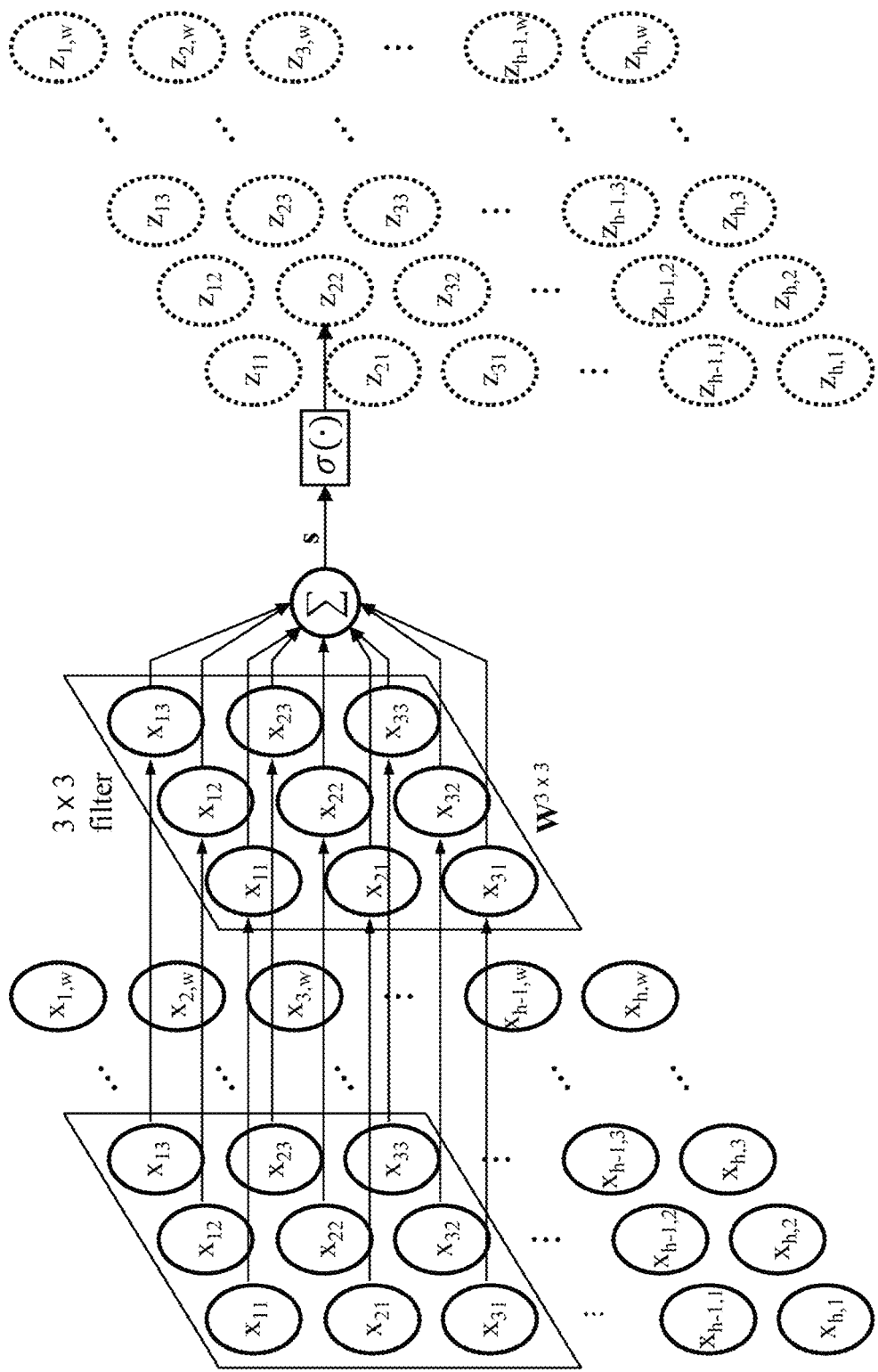
FIG. 7 illustrates a filtering operation in a CNN.

FIG. 7 illustrates a filtering operation in a CNN.

The CNN shown in FIG. 6 faces the issue of an exponential increase in the number of weights depending on the number of connections. Thus, small-sized filters are assumed to exist instead of considering connections between all neurons in adjacent layers. Then, weighted sum and activation function operations are performed on overlapping regions of filter as shown in FIG. 7.

A single filter has weights corresponding to the size of the filter and may undergo learning of the weights such that the filter extracts specific features from an image as factors and produce outputs based on the factors. In FIG. 7, a 3×3 filter is applied to a top-left 3×3 region of an input layer, and an output value obtained by performing the weighted sum and activation function operations on related neurons is stored in $z_{22}$.

The filter scans the input layer, performs the weighted sum and activation function operations while moving horizontally and vertically at regular intervals, and places the output value at the current position of the filter. This operation method is similar to a convolution operation on images in the field of computer vision. Thus, a DNN with such a structure is called a CNN, and a hidden layer generated by the convolution operation is referred to as a convolutional layer. In addition, a neural network with multiple convolutional layers is called a deep convolutional neural network (DCNN).

In the convolutional layer, the weighted sum is calculated by considering only neuron(s) located within a region covered by the current filter, thereby reducing the number of weights. As a result, a single filter may focus on features within a local region. Therefore, the CNN may be effectively applied to process image data where a physical distance in two-dimensional space is an important criterion. In the CNN, multiple filters may be applied immediately before the convolutional layer, and multiple output results may be produced by convolution operations of each filter.

The CNN may be divided into a part for extracting features from data and a part for classifying classes. In the CNN, the part for extracting features from data (hereinafter referred to as a feature extraction region) may be structured by stacking the following layers multiple times: an essential convolutional layer and an optional pooling layer. As the final part of the CNN, a fully connected layer for classifying classes is added. There is a flattening layer that converts image-type data into an array format between the part for extracting features from data and the part for classifying data.

As described above, the convolutional layer applies filters to input data and then incorporates the activation function, and the pooling layer is positioned after the convolutional layer. In the CNN, filters are also referred to as kernels. In the CNN, the filter performs the convolution operation by traversing the input data at specified intervals. The filter applied in the convolutional layer may create a feature map by moving at the specified intervals and performing the convolution operation on the entirety of the input data. For example, referring to FIG. 7, the output values: $z_{11}$ to $z_{h,w}$ may constitute the feature map. If multiple filters are applied to the convolutional layer, the convolution operation is performed for each filter, and the feature map may be created based on the sum of convolutions from the multiple filters. The feature map is also referred to as an activation map. In other words, the CNN consist of an input layer, hidden layers, and an output layer. In the CNN, the hidden layers include layers performing convolutions. Typically, the layer performing the convolution computes a dot product between a convolution kernel and the input matrix of the layer, and the activation function of the layer is commonly a rectified linear unit (ReLU). As the convolutional kernel slides over the input matrix of the layer, the convolution operation creates a feature map that contributes to the input of the next layer.

The pooling layer uses output data from the convolutional layer (e.g., feature map) as input data and reduces the size of the input data or emphasizes specific data. In the pooling layer, the following methods are used to process data: max pooling, which collects the maximum value of values within a specific region of a square matrix; average pooling, which calculates the average of values within a specific region of a square matrix; and min pooling, which determines the minimum value of values within a specific region of a square matrix.

The fully connected layer connects every neuron in one layer to every neuron in another layer.

Shannon established the basis for a mathematical theory of communication, deriving conditions that enable reliable transmission of sequences of symbols over noise channels. A demand for a higher data rate has increased to accommodate new incoming services and/or scenarios in which the virtual and real worlds mix. According to current trends, a bottleneck is expected to occur in the near future due to shortages of resources such as spectrum and energy. For example, when a carrier frequency increases, more spaces for a wider bandwidth is generated, but undesirable phenomena such as blocking, atmospheric absorption, and reduced power efficiency may also occur. The following three levels of communication, identified by Shannon and Weaver, have been considered to deal with the challenges posed by these never-ending demands: (i) transmission of symbols (technical issues); (ii) semantic exchange of transmitted symbols (semantic issues); and (iii) effectiveness of semantic information exchange (effectiveness issues).

Figure 8:
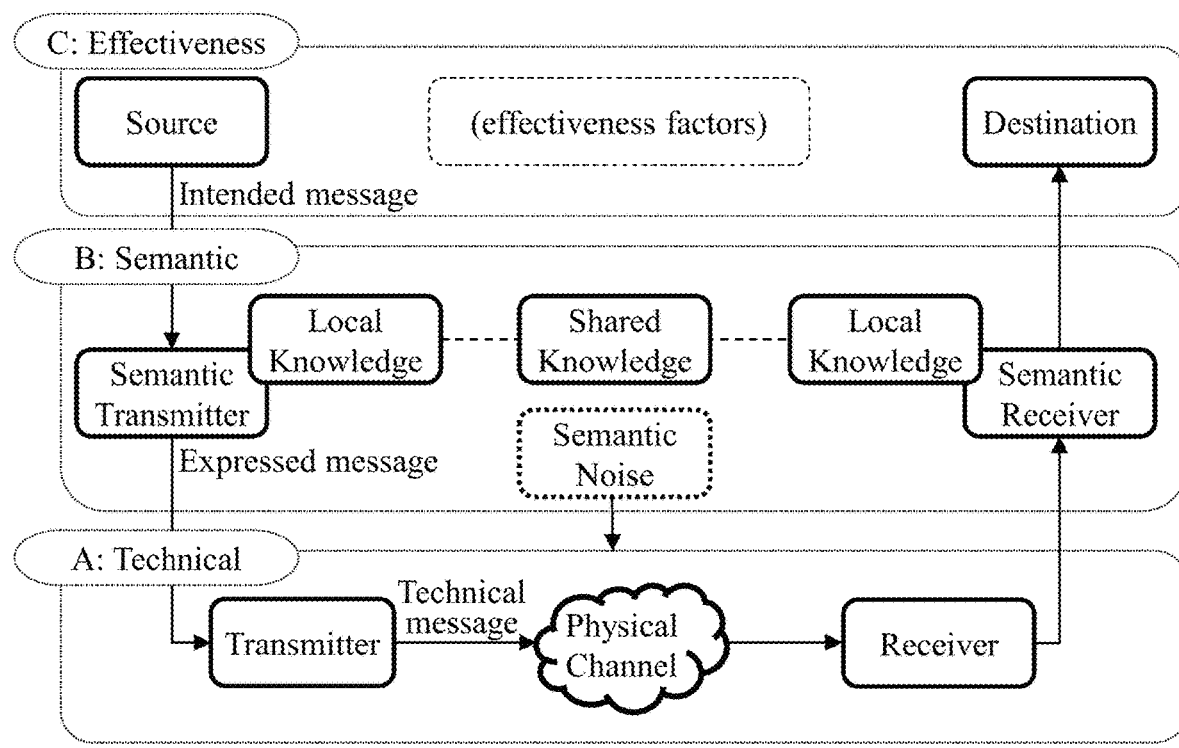
FIG. 8 illustrates a three-level communication model to which implementations of the present disclosure are applicable.

FIG. 8 illustrates a three-level communication model to which implementations of the present disclosure are applicable.

Referring to FIG. 8, the communication model may be defined at three levels A to C. Level A relates to how accurately symbols (technical messages) are to be transmitted between a transmitter and a receiver. The level A may be considered when the communication model is understood from a technical aspect. Level B relates to how accurately the symbols transmitted between a telegraph and a receiver convey the meaning. The level B may be considered when the communication model is understood from a semantic aspect. Level C relates to how effectively the meaning received at a destination contributes to subsequent operations. The level C may be considered when the communication model is understood in terms of effectiveness.

Shannon focused on technical issues and did not consider communication from a semantic aspect. In contrast, Weaver explained that the information theory of Shannon is to be extended to consider the levels B and C, including adding semantic transmitters, semantic receivers, and semantic noise to the communication model of Shannon.

Until 5G communication, technology development was developed focusing only on the level A (i.e., symbol level) for exchanging data. Communication technology research focused on the level A has allowed derivation of a mathematical theory of communication based on probabilistic models. However, for recent networks that emphasize effectiveness and sustainability while enabling pervasive intelligent services, it is no longer justifiable to assume that semantics are irrelevant. In addition to a transmission method, what to transmit also needs to be studied.

Therefore, to respond to a growing need for higher data rates to accommodate new emerging services such as virtual reality or autonomous driving within limited resources such as spectrum and energy, communication model of the level B as well as the level A (the level C) may be considered. In the communication model of the level B, a transmitter and a receiver may be referred to as a semantic transmitter and a semantic receiver, respectively, and semantic noise may be additionally considered.

One of the various goals of 6G communications is to enable a variety of new services that connect machines to people with various levels of intelligence. Not only existing technical issues (e.g., level A in FIG. 8) but also semantic issues (e.g., level B in FIG. 8) need to be considered.

To facilitate understanding, semantic communication is briefly explained below using communication between people as an example. Words for exchanging information (i.e., word information) relate to "meaning." After hearing what a speaker says, a listener may interpret the meaning or concept expressed by words of the speaker. When this is connected to the communication model of FIG. 8, to support semantic communication, a concept related to a message transmitted from a source need to be correctly interpreted at a destination. The communication model at the semantic level (e.g., refer to the level B in FIG. 8) may provide improved performance compared with the communication model of the existing technical level (e.g., refer to the level A in FIG. 8). One of the main reasons such performance improvements is provided is that knowledge sharing between a source and a destination is used. This knowledge may be a language including logical rules and entities that allow a receiver to correct errors that occur at a symbolic level.

One effect of semantic communication is to compress the amount of data information and apply the same to communication. As a metaphor, for example, if a parent and a child walk together on a street when a car approaches and the child runs into a roadway, the parent may only shout "Hey" in an urgent voice. The urgent cry of "Hey" by the parent is conveyed to the child by combining the tone of voice and the name, and the child recognizes the meaning of the cry of "Hey" as a dangerous situation that the parent has educated about in advance. In other words, the meaning that the parent wants to convey is conveyed to the child based on the knowledge shared in advance without having to convey a lot of information. At an effectiveness level, the goal of safety is achieved.

For success of communication at the basic technical level, the case in which an error occurs in data or the case an error does not occur may be primarily considered through cyclic redundancy check (CRC). However, the semantic level communication evaluates a degree by which the meaning that a transmitter wants to convey and the meaning interpreted by a receiver are similar. The similarity between the meaning intended by the transmitter and the meaning understood by the receiver is mainly evaluated by a semantic similarity function.

Figure 9:
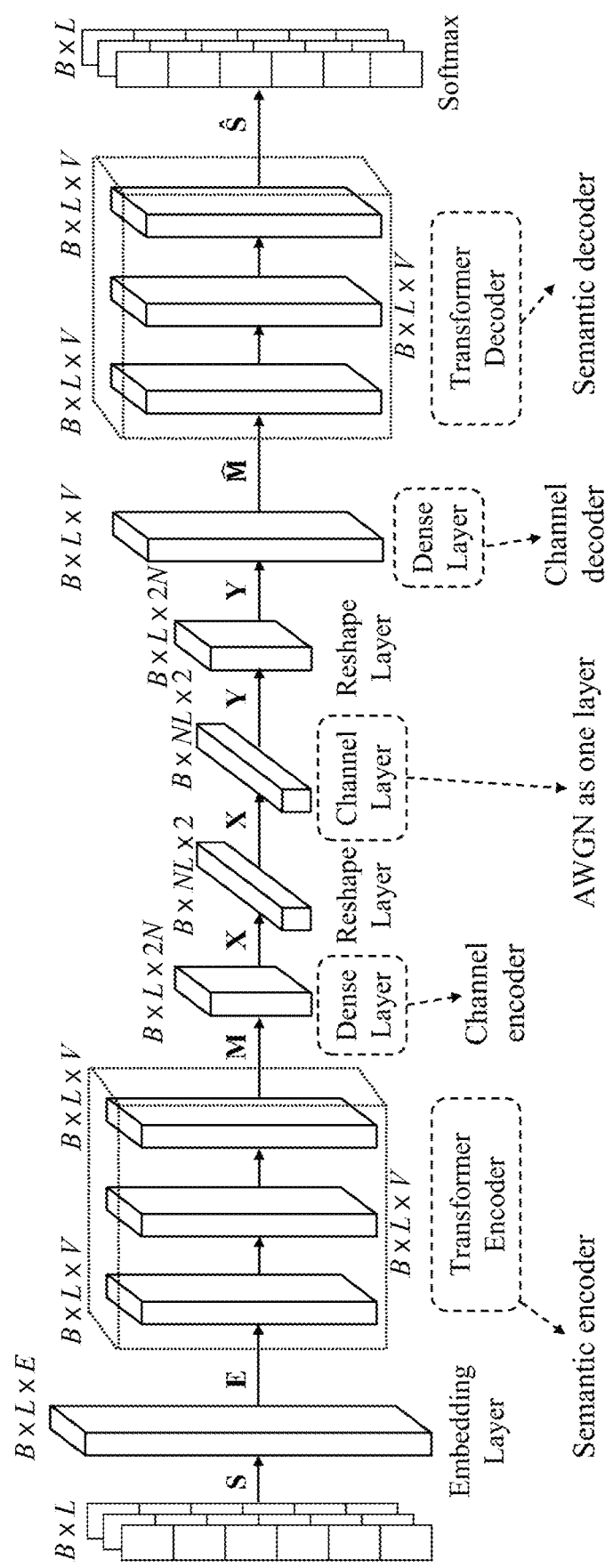
FIG. 9 illustrates a neural network structure for a semantic communication system.

FIG. 9 illustrates a neural network structure for a semantic communication system.

Recently, a communication neural network system that considers both a semantic level and a technical level has been considered. This communication system may include a semantic neural network for processing data at a semantic level and a channel neural network for processing data at a technical level. A transmitter and a receiver may each include encoder neural network(s) and decoder neural network(s). A communication neural network may perform channel coding to reduce errors in the symbol(s) to be transmitted on a channel. The semantic neural network may perform a type of source coding. The semantic communication system of FIG. 9 may compress information and effectively transmit the same to a communication channel. For example, a deep learning-based semantic communication system for text transmission has been recently proposed (refer to: "H. Xie, Z. Qin, G. Y. Li, B.-H. Juang, Deep learning enabled semantic communication systems"). The semantic communication system aims to maximize system capacity and minimize semantic errors by recovering the meaning of sentences rather than bit- or symbol-errors in traditional communications based on a transformer.

However, in this communication system, when semantic distortion occurs due to noise during transmission of transmission data through a semantic encoder and a channel encoder, there is a problem in that retransmission using a method such as HARQ and incremental redundancy may not be performed. The HARQ is a technology that combines forward error correction (FEC) and automatic repeat request (ARQ), and the incremental redundancy is a technology that improves reliability by changing additional information in the form of FEC (e.g., redundancy version (RV) during retransmission. The HARQ is the most widely used error correction scheme in existing technical level communications and is used to recover data by transmitting only part of the transmission information.

Hereinafter, implementations of the present disclosure for resolving problems that may occur in semantic-based communication are described.

1) Semantic Communication System: Semantic Decompose Network

A neural network-based communication system according to some implementations of the present disclosure decomposes data into a plurality of semantic or semantic elements and transmits the same to effectively reduce the amount of data transmission in semantic communication and ensure reliability. For example, a transmitter may decompose data into a plurality of semantic elements agreed upon between a transmitter and a receiver and gradually transmit a subset of the decomposed semantic elements depending on a channel situation according to a capacity of a communication channel.

When humans see data, they recognize the data and give meaning to the data through feature(s) thereof. A neural network in implementations of the present disclosure also mimics this. That is, in implementations of the present disclosure, the neural network learns the feature(s) of the data. The 'learning' converts data into another form of meaningful data within a neural network. This is called a semantic element. The semantic element may be a set of features or representations in which data is decomposed (or transformed) through neural network learning. This set is shared between the transmitter and the receiver.

Figure 10:
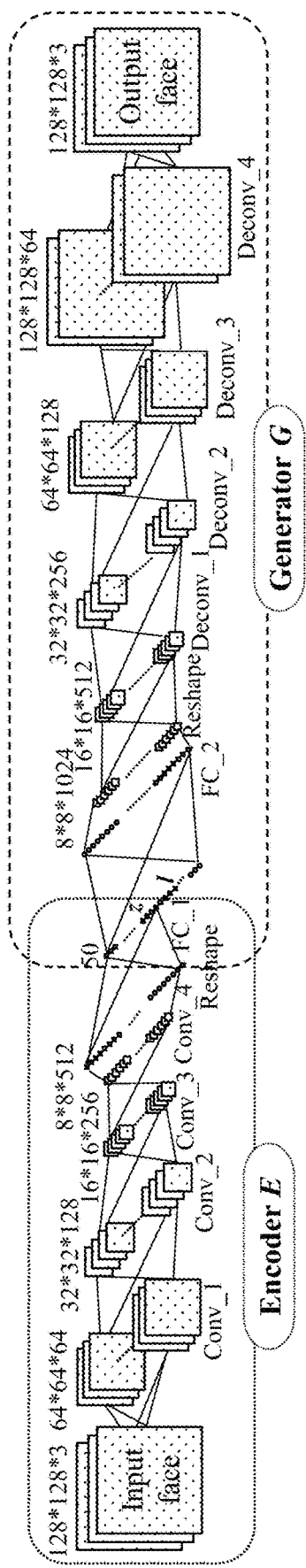
FIG. 10 illustrates a conditional adversarial autoencoder.

FIG. 10 illustrates a conditional adversarial autoencoder.

For example, referring to FIG. 10, a mapping relationship between a feature (or representation) and a position within a latent space M corresponding to an encoder output z in a neural network $y=E_\phi(x)$ using facial image data as an input may be learned. After learning, a point on a continuous line in a horizontal direction of the latent space corresponds to a single meaning, such as a person facial expression, and a vertical direction corresponds to the meaning of different people. When a set of these features is transmitted, a generator network recovers data based thereon (refer to: "Zhifei Zhang et al, Age Progression/Regression by Conditional Adversarial Autoencoder, CVPR 2017").

Semantic transformation of data may correspond to high-dimensional data with low-dimensional semantics. A set of decomposed semantic elements is mapping to a latent space set S with a meaning mutually agreed upon by the transmitter and the receiver, and ranks and dimensions of a tensor set S are always equal to or less than the rank and dimension of data D.

Figure 11:
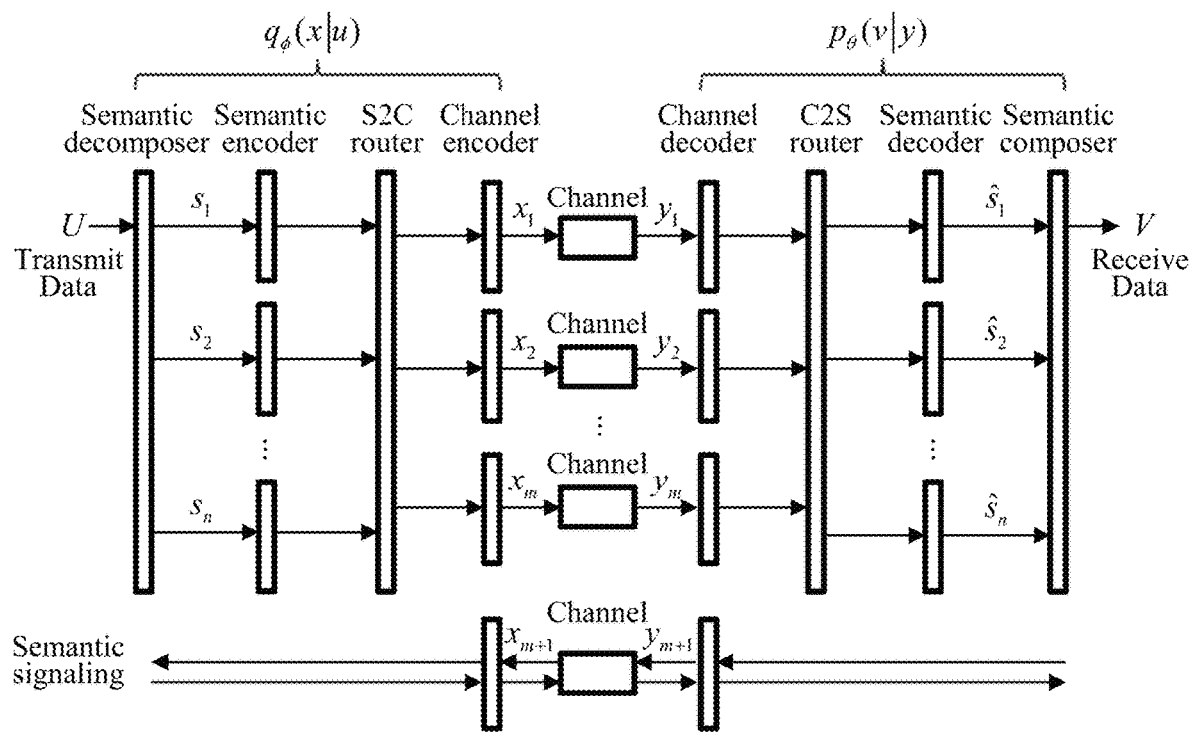
FIG. 11 illustrates a neural network according to some implementations of the present disclosure.

FIG. 11 illustrates a neural network according to some implementations of the present disclosure.

1-a) Semantic Decomposer

Referring to FIG. 11, a semantic decomposition layer is a neural network layer that extracts semantics using the feature extraction capability of the neural network and decomposes the semantics into n tensors, which are n semantic elements. The semantic decomposition layer separates a multidimensional tensor input into n independent neural networks and delivers the same to a semantic encoder. In some implementations, due to the structure of multi-task learning, multiple tasks may correspond to multiple semantics. The semantic decomposition layer may prevent overfitting in learning by applying a common structure of data representation. When the semantic decomposition layer is represented as $(s_1, s_2, s_3, \ldots, s_n)=f(U)$, the amount of semantic redundancy information is increased as an occurrence conditional probability value $P(s_i|s_j)$ between semantic elements is increased. Therefore, when data is actually transmitted, not an entire set $S=(s_1, s_2, s_3, \ldots, s_n)$ of all semantic elements is transmitted, but data may be recovered at a receiving end even if only some of the semantic elements are transmitted.

1-b) Semantic Encoder and Semantic Decoder

A semantic encoder is a neural network layer that encodes semantic elements obtained by decomposing the extracted semantics into a latent space for transmission. The semantic encoder performs a type of lossy information compression. However, while existing source coding performs coding using symbol probability distribution of data, the semantic encoder extracts meaning from the data and performs coding. A semantic encoding/decoding process is a process in which a transmitter and a receiver share meaning-related background knowledge with each other through a neural network in semantic communication. In other words, the transmitter and the receiver also learn and share a dependency relationship between semantic elements such that the semantic elements are background knowledge thereof.

1-c) Semantic-to-Channel ($s_2C$) Router and Channel-to-Semantic (C2S) Router

Each of the $s_2C$ router and the C2S router is a network that functions as data routing between the semantic layer and the channel layer according to the amount of m individual semantic information. The $s_2C$ router and the C2S router measure self-information entropy and mutual information amount of each decomposed semantic tensor to perform optimization and allocate channels.

1-d) Channel Encoder and Channel Decoder

The channel encoder and the channel decoder are neural network layers that maximize the amount of mutual information for n communication channels.

1-e) Semantic Composer

The receiver receives a set of n or less than n semantic elements and generates data V in layer $y=g(\hat{S})$ (here, $\hat{S}$=subset of $\{\hat{s}_i\}$). The receiver may jointly combine the transmitted semantics by decomposing the same into n or less, perform maximum likelihood estimation, and perform recovery to final data. This process may be represented as follows.

$$V = \arg\max_v \log P(V' = v|\hat{S}), \hat{S} = \text{subset of } \{\hat{s}_i\} \quad \text{[Equation 1]}$$

When the currently received semantic element(s) are combined with the previously received semantic elements, data V at the receiver may be represented as follows.

$$V = \arg\max_v \log P(V' = v|\hat{S^1}, \hat{S^2}, \ldots, \hat{S^{t-1}}), \quad \text{[Equation 2]}$$

$$S^t = \text{subset of } \{\hat{s}_i\}, i = 1 \sim n \text{ at } t$$

The receiver may determine that retransmission is needed when a maximum value of a conditional probability of a semantic element received in the past for a probability of the semantic element $S^t$ received at time t is less than a certain threshold as follows:

$$\max \log P(S^t|\hat{S^1}, \hat{S^2}, \ldots, \hat{S^{t-1}}) < \text{thresh} \quad \text{[Equation 3]}$$

The conditional probability may be implemented in a neural network through learning.

1-f) Semantic Signaling Blocks

Semantic signaling blocks are communication neural networks for exchanging retransmission signaling information between a transmitter and a receiver. The semantic signaling block may request retransmission for a semantic subset (e.g., some of the semantic elements) when a reception probability is low. In some implementations of the present disclosure, retransmission may be performed on a subset of an information set $S=\{s_i\}$ of X.

2) Process for Semantic Decomposition Network

Hereinafter, a semantic communication process according to some implementations of the present disclosure will be described.

Operation 1) Semantic Agreement

Figure 12:
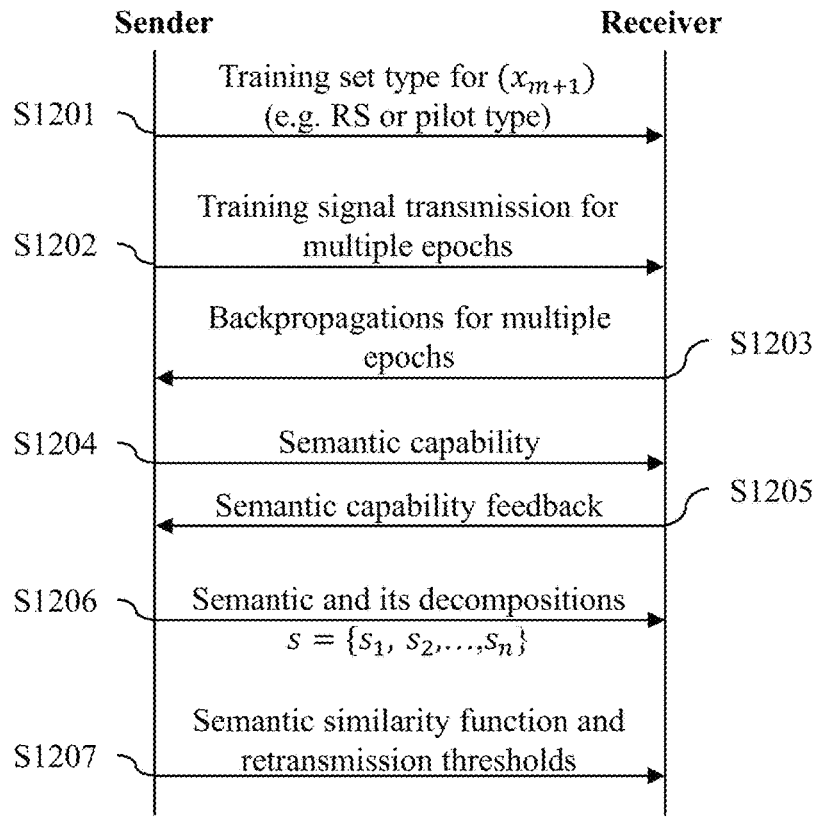
FIG. 12 illustrates a process of semantic agreement according to some implementations of the present disclosure.
Figure 13:
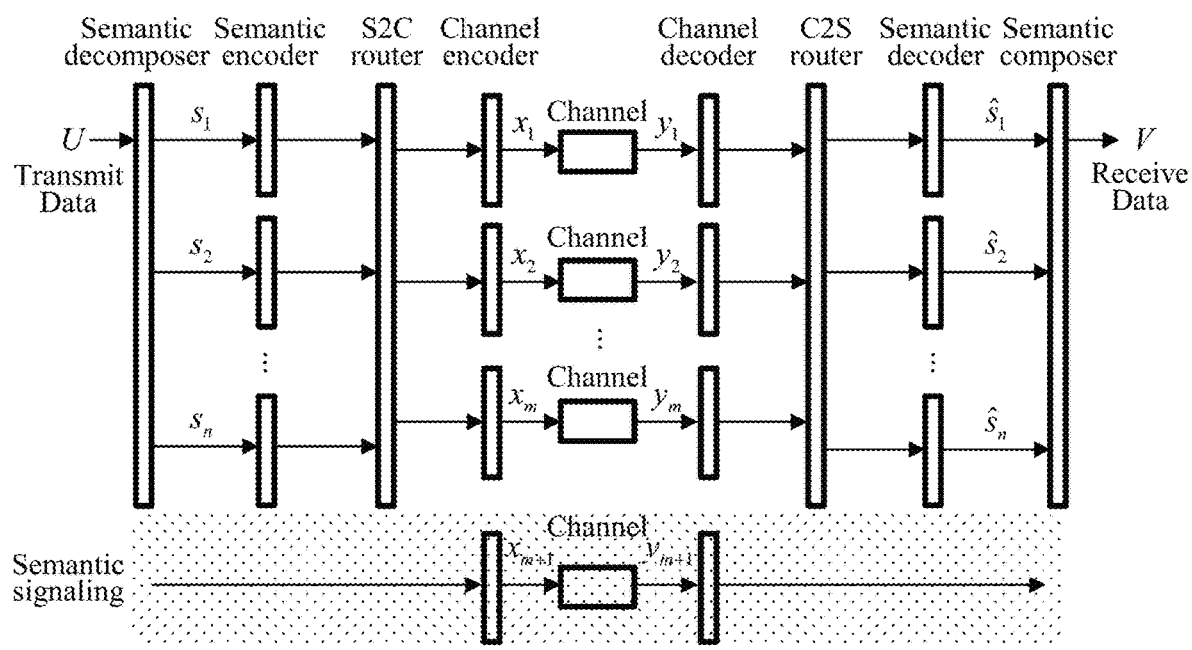
FIG. 13 is a diagram shading only a portion related to semantic agreement in the neural network illustrated in FIG. 11.

FIG. 12 illustrates a process of semantic agreement according to some implementations of the present disclosure. FIG. 13 is a diagram shading only a portion related to semantic agreement in the neural network illustrated in FIG. 11.

The semantic agreement is a process of ensuring a wireless communication path for semantic agreement in a semantic signaling block and exchanging semantic mutual information. The semantic agreement may also be a process of maximizing the amount of mutual information about channel input $x_{m+1}$ and channel output $y_{m+1}$ for semantic signaling. For semantic agreement, transmission of a training set is performed through a reference signal or a pilot signal (S1201). A sender and a receiver ensure a signaling channel by performing semantic signaling neural network learning for multiple epochs through error backpropagation (S1202 to S1203).

The sender may check a communicable semantic class to the receiver (S1204 to S1205). To check this, the receiver may request information about possible semantic support classes. The sender checks this, identifies the possible semantic classes, and performs a consensus process on decomposed semantic information. The information delivered to the consensus process is a semantic similarity function and retransmission thresholds.

The semantic class is a set of decomposed semantic elements possible between transmission and reception. For example, original data to be transmitted may include images, videos, controls, and text. Decomposed semantics may also be specified within each type. In the case of images, there may be semantics that only distinguish whether an object is present or not, and in the case of videos, only specific information such as a background screen may be required. For example, the sender may transmit only specific objects and background information in an image, and the receiver may only receive a text summary therefor. The semantic class may include possible combination(s) between the sender and the receiver.

A function for semantic similarity between transmission and reception may be exchanged. This may be used to train a quality measurer and a neural network between transmission and reception when a semantic element is received. In semantic communication, retransmission is necessary when semantic data is incorrectly received. When the overall probability of reception is less than a certain threshold, the receiver may request retransmission.

Operation 2) Build Communication Channel

Figure 14:
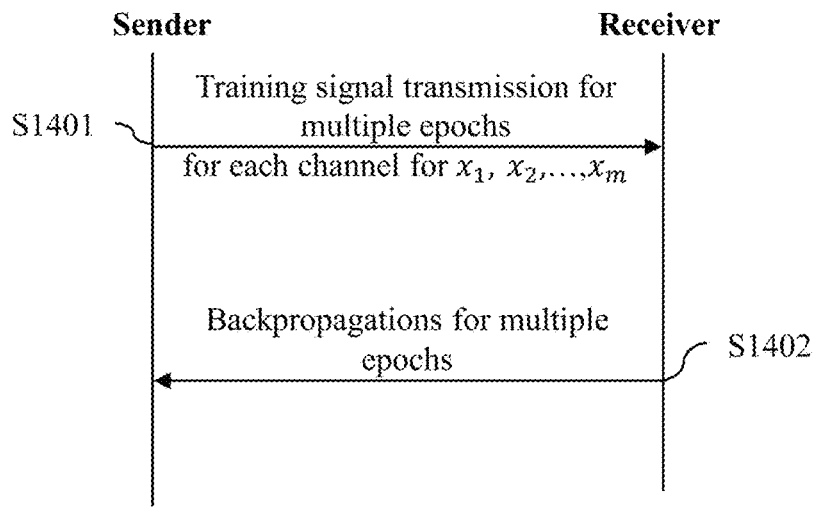
FIG. 14 illustrates a communication channel establishment process according to some implementations of the present disclosure.
Figure 15:
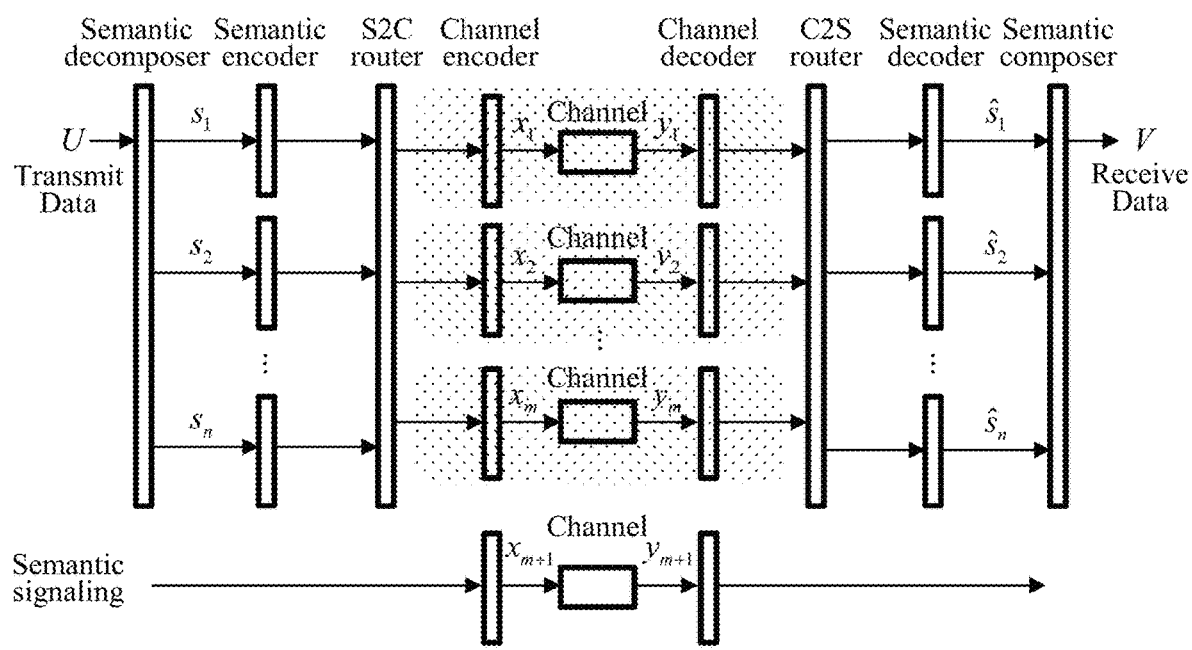
FIG. 15 shades a portion that serves as a sender/receiver for conventional communication in the neural network illustrated in FIG. 11.

FIG. 14 illustrates a communication channel establishment process according to some implementations of the present disclosure. FIG. 15 shades a portion that serves as a sender/receiver for conventional communication in the neural network illustrated in FIG. 11.

The sender and the receiver may ensure a communication path for vector transmission of decomposed semantic element(s). The number n of decomposed semantic elements and the number m of communication channels may have different values. In an operation of ensuring a communication path for transmission of semantic elements, each neural network maximizes the amount of mutual information for m multiple wireless channels. To this end, a sender and a receiver perform backpropagation learning by exchanging a common reference signal or pilot signal for training each channel encoder/decoder (S1401 to S1402).

Operation 3) Semantic-to-Channel or Channel-to-Semantic Allocation

Figure 16:
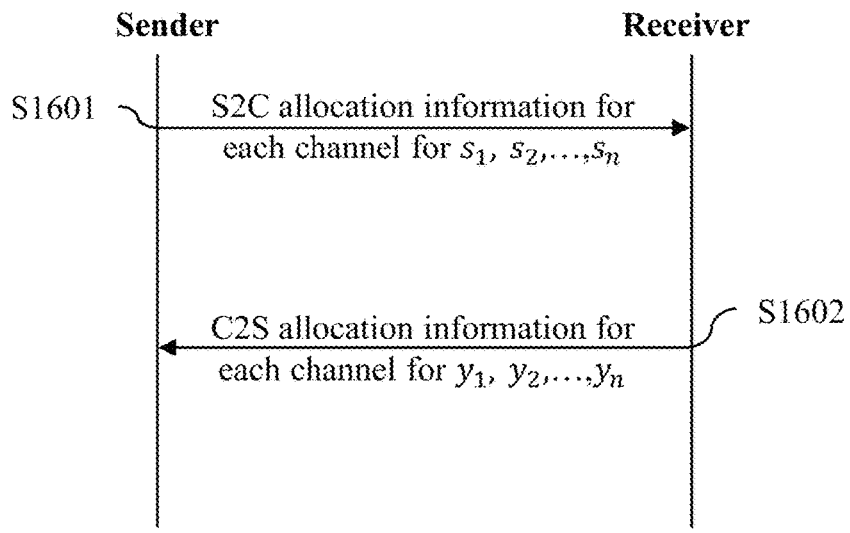
FIG. 16 illustrates a semantic-to-channel/channel-to-semantic allocation process according to some implementations of the present disclosure.
Figure 17:
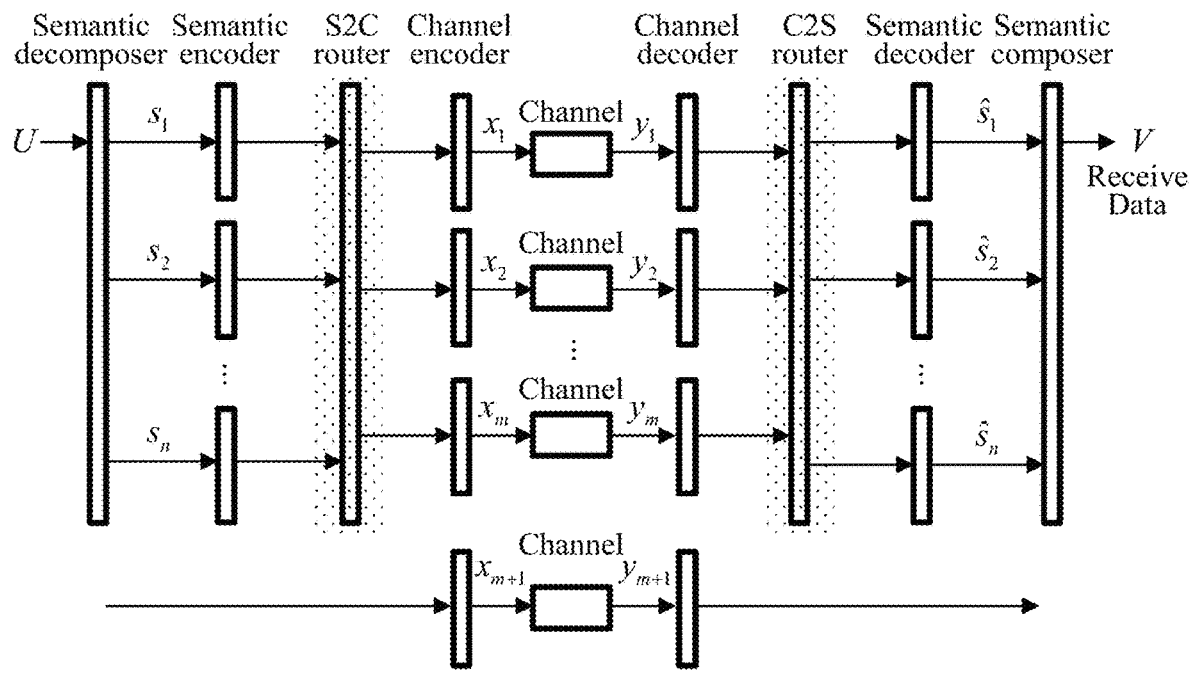
FIG. 17 is a diagram shading a semantic-to-channel/channel-to-semantic router in the neural network illustrated in FIG. 11.

FIG. 16 illustrates a semantic-to-channel/channel-to-semantic allocation process according to some implementations of the present disclosure. FIG. 17 is a diagram shading a semantic-to-channel/channel-to-semantic router in the neural network illustrated in FIG. 11.

The information amount of the decomposed semantic elements is all different, and thus the semantic element(s) are allocated to the communication channel accordingly. n semantic elements are allocated to m channel encoders/decoders. Mapping $s_i \rightarrow x_j$ may be performed with a S2C router (S1601), and a C2S router may perform mapping $y_j \rightarrow \hat{s}_i$ (S1602).

Operation 4) Semantic Encoder-Decoder/Composer Training

Figure 18:
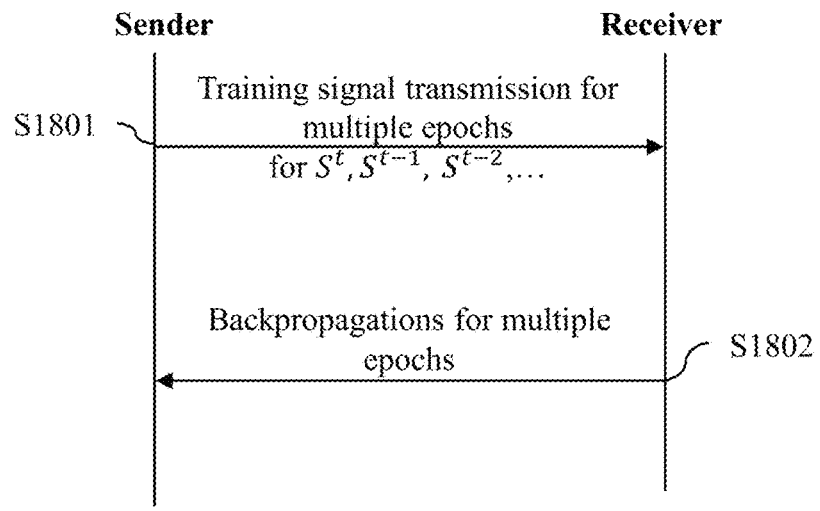
FIG. 18 illustrates a training process for a semantic encoder-decoder/decomposer-composer according to some implementations of the present disclosure.
Figure 19:
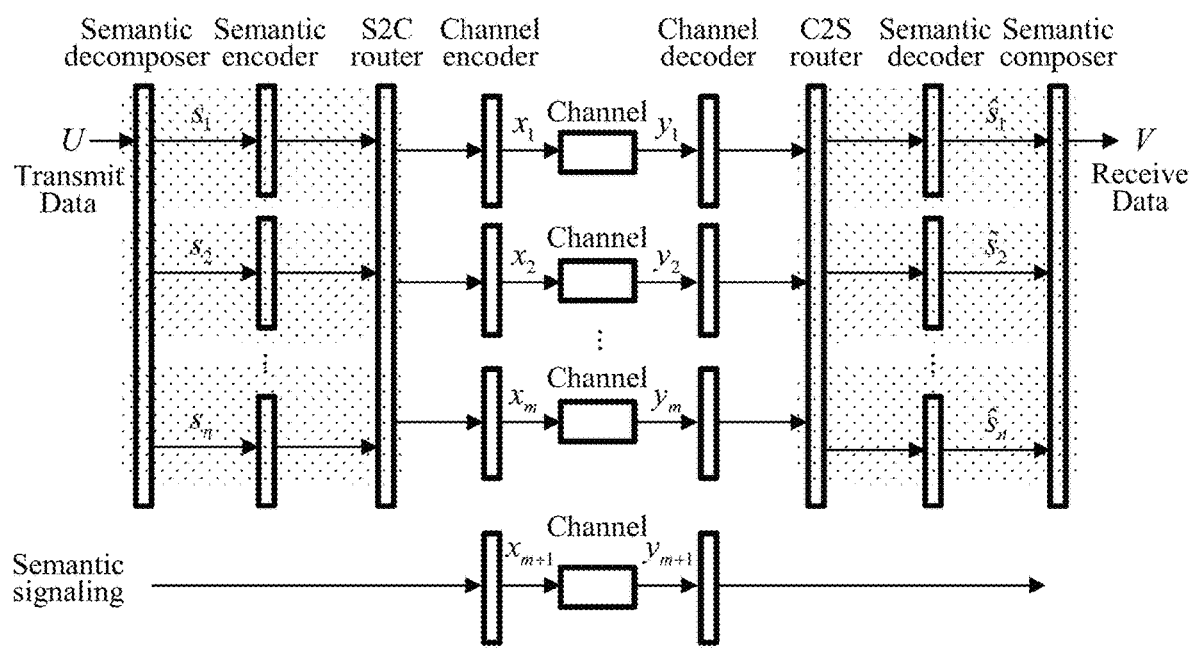
FIG. 19 illustrates shading a semantic encoder/decoder and a semantic decomposer/composer in the neural network illustrated in FIG. 11.

FIG. 18 illustrates a training process for a semantic encoder-decoder/decomposer-composer according to some implementations of the present disclosure. FIG. 19 illustrates shading a semantic encoder/decoder and a semantic decomposer/composer in the neural network illustrated in FIG. 11.

For training of the semantic encoder/decoder and training of the semantic decomposer/composer, the sender may transmit a training signal for multiple epochs (S1801), and the receiver may perform backpropagations to the sender during the multiple epochs (S1802).

Training may be performed to maximize an objective function L(s;ŝ) for semantics between transmission and reception. This may be represented as follows.

$$\hat{S}_t = \arg\ \max\ \log\ P(S^t|\widehat{S^1},\widehat{S^2},\ldots,\widehat{S^{t-1}})  \quad \text{[Equation 4]}$$

Semantics S transmitted at a time t is a subset of semantic elements {$s_1$, $s_2$, ..., $s_n$} that are decomposed into N. A semantic composer is a neural network that outputs the maximum probability based on the semantics $\widehat{S^1},\widehat{S^2},\ldots,\widehat{S^{t-1}}$ received from a time 1 to a time t−1.

Operation 5) Semantic Transmission

Figure 20:
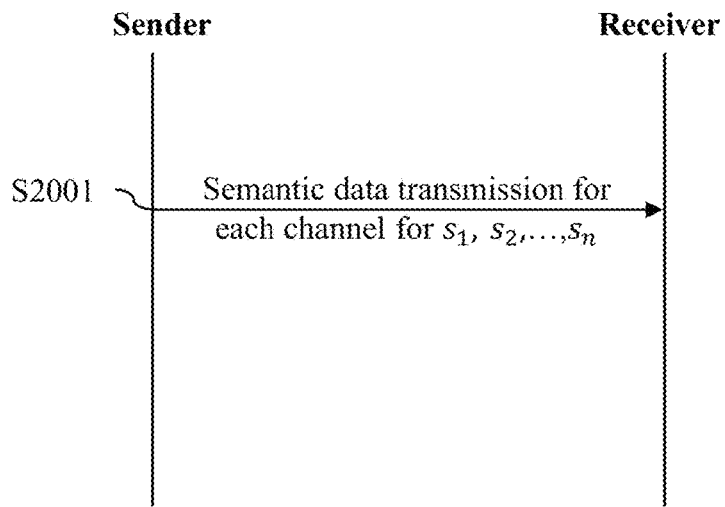
FIG. 20 illustrates semantic transmission according to some implementations of the present disclosure.
Figure 21:
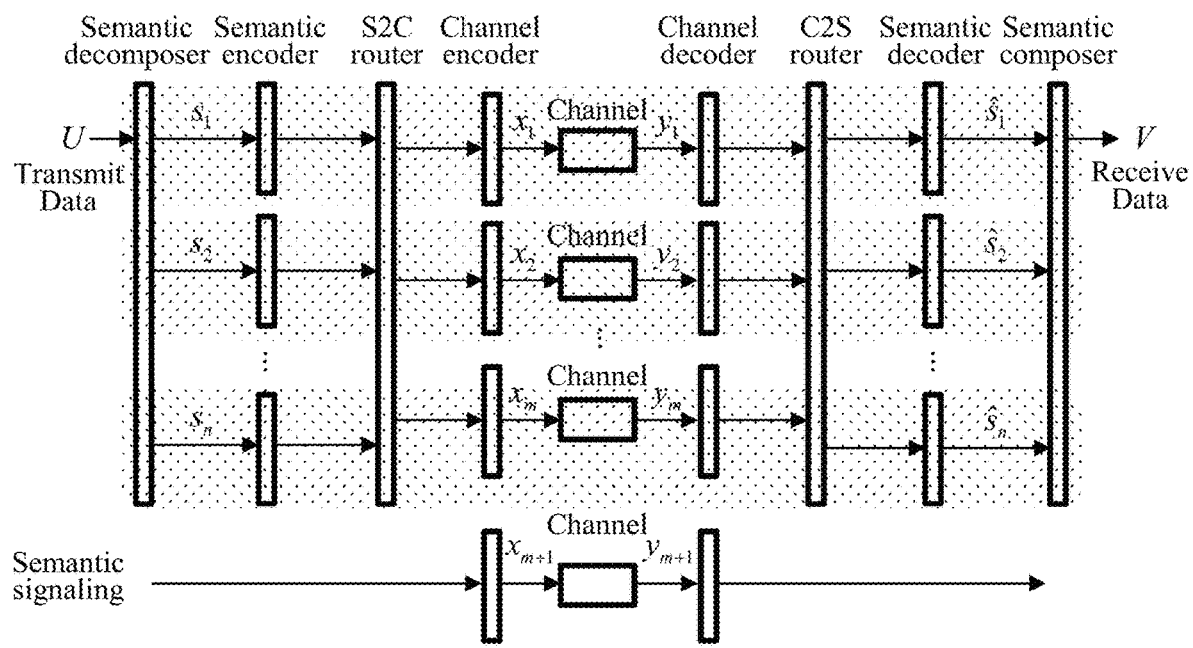
FIG. 21 is a diagram shading portions related to semantic transmission in the neural network illustrated in FIG. 11.

FIG. 20 illustrates semantic transmission according to some implementations of the present disclosure. FIG. 21 is a diagram shading portions related to semantic transmission in the neural network illustrated in FIG. 11.

A sender may perform actual semantic data transmission (S2001). In some cases, the sender repeats operations 2 to 5.

Operation 6) Semantic Retransmission Feedback

Figure 22:
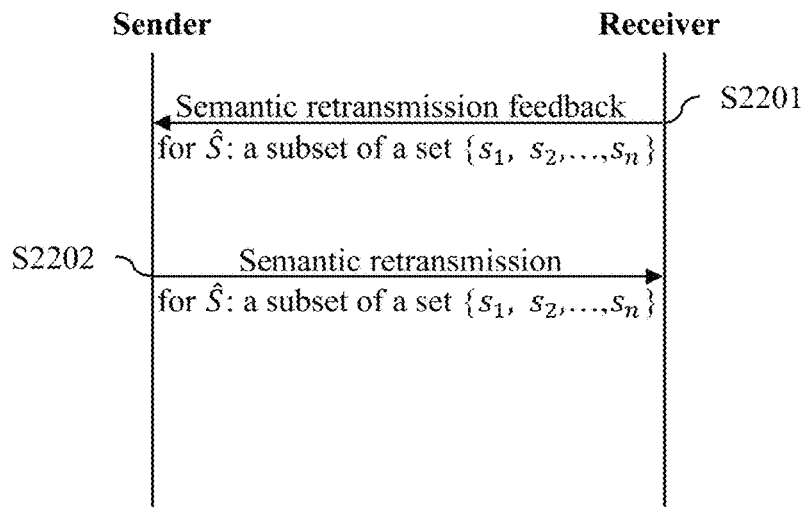
FIG. 22 illustrates a semantic retransmission process according to some implementations of the present disclosure.
Figure 23:
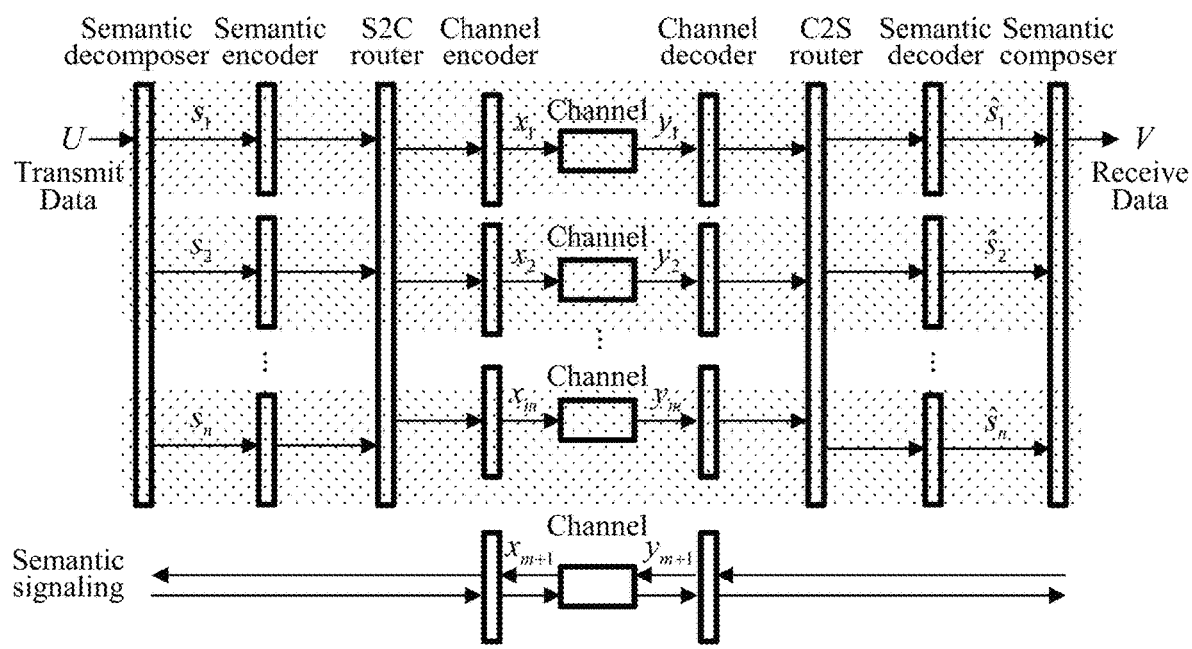
FIG. 23 is a diagram shading portions related to a semantic retransmission process in the neural network illustrated in FIG. 11.

FIG. 22 illustrates a semantic retransmission process according to some implementations of the present disclosure. FIG. 23 is a diagram shading portions related to a semantic retransmission process in the neural network illustrated in FIG. 11. Retransmission occurs between a final sender and a final receiver, that is, end-to-end, and thus it may be seen that all neural networks are involved.

The receiver may evaluate semantic correctness of a set of received semantic elements. For example, the receiver may evaluate correctness based on a joint probability distribution or a conditional probability distribution for a set of the received semantic elements. When the semantic correctness is lower than a threshold, feedback may be performed to inform the sender that the semantic correctness is lower than the threshold (S2201), and the sender may perform semantic retransmission based on the feedback (S2202). The semantic correctness may be a log maximum likelihood probability of the currently received information. For example, the semantic correctness may be represented as follows:

$$P_{\hat{S}_t} = \max\ \log\ P(S^t|\widehat{S^1},\widehat{S^2},\ldots,\widehat{S^{t-1}}) \quad \text{[Equation 5]}$$

When this value is low, the receiver may request retransmission. For example, the receiver may request retransmission when semantic correctness satisfies the following conditions.

$$P_{\hat{S}_t} < SC\_thresh \quad \text{[Equation 6]}$$

Here, SC_thresh is a threshold used to determine whether the receiver requests retransmission for semantics.

According to the retransmission request from the receiver, the sender may perform operation 5.

3) Example

For example, implementations of the present disclosure may be considered for transmitting an image of an AR/VR camera that needs to efficiently transmit a large amount of data with a small bandwidth. An image may be largely classified into a location that occupies a lot of data and an action of an object thereabove. It may be assumed that, in addition to the location and the action of the object, information about a subject and a scene is to be additionally transmitted. Based on this assumption, semantic elements in neural network representation learning may be configured, for example, as follows: S={$s_1$, $s_2$, $s_3$, $s_4$}, where $s_1$:=subject, $s_2$:=place, $s_3$:=sentiment, $s_4$:=object action.

The semantic element $s_i$ is a vector or a tensor value that exists in a latent space through representation learning of a neural network. When training is completed with training data, $s_i$ corresponds to a specific point in numerous continuous latent spaces. For convenience of description, only the following candidates are assumed in the continuous space of real values that a weight and a bias of the neural network may have. In reality, the size of the candidates may be determined depending on the sizes of the neural networks at a transmitting end and a receiving end. An image U may be decomposed into ($s_1$, $s_2$, $s_3$, $s_4$)=f(U) in a semantic decompose layer.

TABLE 1

| | $s_1$ (subject) | $s_2$ (place) | $s_3$ (sentiment) | $s_4$ (object action) |
|---|---|---|---|---|
| Possible candidates | {sports, entertainment, ceremony, food, shopping, research} | {office, cemetery, highway, urban street, church, school, park} | {positive, negative neutral} | {Two kids playing with balls, people praying, two men studying, Two kids taking class, doctor checking patient, policeman chasing criminal car, Two kids playing with flower, people laughing, lady driving a car, person paying tribute} |

Hereinafter, to distinguish semantic elements that are the basis for decomposing data (e.g., subject, place, sentiment, and object action in Table 1) and specific candidate values of the respective semantic elements, the standard for decomposing data is called a semantic element, and the specific candidate value of the corresponding semantic element is called a semantic element value.

A conditional probability between semantic element values of an image may not be 0. For example, the following values may have fairly large conditional probability values close to 1: P($s_4$='people laughing'|$s_1$='entertainment'). $s_1$ and $s_4$ each have semantic redundancy information. The following values may have moderate conditional probability values: P($s_4$='people laughing'|$s_2$='school'). However, the following conditional probability values may be very small: P($s_4$='lady driving a car'|$s_2$='office'). As such, there is a dependency relationship between semantic elements $s_i$, it may be said that semantic redundancy information exists.

Due to this redundancy information, a transmitting end may transmit only some of the semantic element values, and a receiving end may perform retransmission with a desired level of semantic correctness. Therefore, transmission/reception of semantic data according to some implementations of the present disclosure may save a bandwidth for transmission/reception of the semantic data and increase communication efficiency. A receiving neural network may operate in the form of a generative network by using a subset of semantic elements to recompose data into image data.

For example, it is assumed that the transmitting end transmits an image of children playing ball in a park. When the transmitting end only transmits first transmission $S^1 = \{s_2 = \text{'park'}, s_4 = \text{'two kids playing with balls'}\}$, there may be a probability that the first transmission $S^1$ is distorted due to noise and is received as $\widehat{S^1} = \{s_2 = \text{soft value between 'highway'} \sim \text{'park'}, s_4 = \text{'two kids playing with balls'}\}$ at the receiving end. That is, the value $s_2$ may be distorted by noise into a soft value in the latent space. For example, at the receiving end, the value $s_2$ may not completely match any of the candidates for a place in Table 1, but may be mapped to a soft value that is likely to be mapped to a point between several candidates. In this case, the following probability may be estimated in a semantic composite layer by using only this information through maximum likelihood image estimation. That is, the semantic synthesis layer may evaluate a probability of an image with maximum likelihood when only $s_4$ is received.

$$\max \log \quad \text{[Equation 7]}$$
$$P(S|\hat{S}_1 = \{s_2 = \text{soft value between 'highway'} \sim \text{'park'},$$
$$s_4 = \text{'two kids playing with balls'}\})$$

For example, a probability of a child playing ball on a highway is very low, and thus when a probability of first transmission is evaluated, the probability is 0.1, and when a reference of semantic correctness is 0.8, this probability value does not meet the reference, and thus the receiving end may request the transmitting end to retransmit values for some of the semantic elements. In some implementations, the receiving end may perform a retransmission request with reference to a channel SNR. For example, the receiving end may request the transmitting end to perform $s_1$ retransmission on a channel with a high SNR, and after $s_1$ retransmission is successfully performed, an image is evaluated again.

$$\max \log \ P(S|\widehat{S^1}, \widehat{S^2} = \quad \text{[Equation 8]}$$
$$\{s_1 = \text{'entertainment'}, s_4 = \text{'two kids playing with balls'}\})$$

The maximum likelihood value based on retransmission and previous transmissions may exceed the reference of the semantic correctness. Thus, the image V of "children playing ball in the park" is generated by evaluating the following maximum likelihood formula in a composed neural network based on the semantic elements received up to that point.

$$V = \arg\max_{v} \log \ P(V' = v|\widehat{S^1}, \widehat{S^2} = \quad \text{[Equation 9]}$$
$$\{s_1 = \text{'entertainment'}, s_4 = \text{'two kids playing with balls'}\})$$

When data that the transmitting end wants to transmit is a video and the video includes images of children playing with flowers while playing ball in the park, in the above example, the transmitting end may perform first transmission $S^1$ related to the image of children playing ball in the park and transmission $S^3$ related to the image of children playing with flowers subsequent to the transmission $S^2$. In this case, for example, the transmitting end may transmit only $s_4$, which has the largest amount of information, as transmission of $S^3$. However, the transmission of $S^3$ may be received at the receiving end as follows due to noise.

$$\widehat{S^3} = \{s_3 = \text{soft value between} \quad \text{[Equation 10]}$$
$$\text{'two kids playing with flower'} \sim \text{'two kids taking class'}\}$$

In this case, the receiving end may evaluate $$V = \arg\max_{v} \log \ P(V' = v|\widehat{S^1}, \widehat{S^2}, \widehat{S^3}),$$

and thus a probability of playing with flowers is higher than a probability that children take a class at the park based on $\widehat{S^1}, \widehat{S^2}$, and $\widehat{S^3}$, and an image of playing with flowers may be generated.

In some implementations of the present disclosure, retransmission may be performed for efficient transmission of semantic data. For efficient transmission/retransmission of semantic data, semantic elements with decomposed semantics may be agreed upon between the sender and the receiver. In some implementations of the present disclosure, the meaning of data is extracted using a semantic decomposition neural network and transmitted/received using a communication neural network. In other words, some implementations of the present disclosure may resolve transmission and retransmission problems by utilizing both a semantic neural network and a communication neural network. According to some implementations of the present disclosure, a problem of interface matching of semantic communication may be resolved through a procedure for agreeing on semantic elements between the sender and the receiver. According to some implementations of the present disclosure, retransmission may be performed based on semantic correctness. According to some implementations of the present disclosure, a bandwidth may be saved when large-scale data is transmitted, and retransmission using semantic redundancy information may be supported.

For data transmission at a transmitting device, the transmitting device may perform operations according to some implementations of the present disclosure. The transmitting device may include: at least one transceiver; at least one processor; and at least one computer memory operably connected to the at least one processor and configured to store instructions that, when executed, cause the at least one processor to perform the operations according to some implementations of the present disclosure. A processing device for the transmitting device may include: at least one processor; and at least one computer memory operably connected to the at least one processor and configured to store instructions that, when executed, cause the at least one processor to perform the operations according to some implementations of the present disclosure. A computer-readable (non-transitory) storage medium may be configured to store at least one computer program including instructions that, when executed by at least one processor, cause the at least one processor to perform the operations according to some implementations of the present disclosure. A computer program or computer program product may include instructions stored on at least one computer-readable (non-transitory) storage medium and, when executed, cause (at least one processor) to perform the operations according to some implementations of the present disclosure.

In the transmitting device, the processing device, and the computer-readable (non-transitory) storage medium, and/or the computer program product, the operations may include decomposing data into semantic element values respectively corresponding to a plurality of semantic elements based on the semantic elements, performing first transmission including some semantic element values from among the semantic element values, and performing retransmission including at least one semantic element value other than the semantic element values provided in the first transmission from among the plurality of semantic element values based on reception of a retransmission request for the first transmission from a receiving device.

In some implementations of the present disclosure, the retransmission request may include information requesting the at least one semantic element value.

In some implementations of the present disclosure, the retransmission request may include information about a channel for the retransmission.

In some implementations of the present disclosure, the transmitting device may include a semantic decomposition layer. The decomposing of the data into the semantic element values may be performed by the semantic decomposition layer.

In some implementations of the present disclosure, the operations may include negotiating the plurality of semantic elements with the receiving device.

For data reception at a receiving device, the receiving device may perform operations according to some implementations of the present disclosure. The receiving device may include: at least one transceiver; at least one processor; and at least one computer memory operably connected to the at least one processor and configured to store instructions that, when executed, cause the at least one processor to perform the operations according to some implementations of the present disclosure. A processing device for the receiving device may include: at least one processor; and at least one computer memory operably connected to the at least one processor and configured to store instructions that, when executed, cause the at least one processor to perform the operations according to some implementations of the present disclosure. A computer-readable (non-transitory) storage medium may be configured to store at least one computer program including instructions that, when executed by at least one processor, cause the at least one processor to perform the operations according to some implementations of the present disclosure. A computer program or computer program product may include instructions stored on at least one computer-readable (non-transitory) storage medium and, when executed, cause (at least one processor) to perform the operations according to some implementations of the present disclosure.

In the receiving device, the processing device, and the computer-readable (non-transitory) storage medium, and/or the computer program product, the operations may include receiving, from a transmitting device, first transmission including semantic element values for some semantic elements from among a plurality of semantic elements, composing semantic data based on the semantic element values provided in the first transmission, calculating semantic correctness for the composed semantic data, transmitting a retransmission request for the first transmission based on the semantic correctness lower than a threshold, and receiving retransmission including a semantic element value for at least one semantic element other than the some semantic elements.

In some implementations of the present disclosure, the retransmission request may include information requesting the at least one semantic element.

In some implementations of the present disclosure, the retransmission request may include information regarding a channel for the retransmission.

In some implementations of the present disclosure, the receiving device may include a semantic decomposition layer. The semantic data may be composed by the semantic composition layer.

In some implementations of the present disclosure, the operations may include negotiating the plurality of semantic elements with the transmitting device.

The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

The implementations of the present disclosure may be used in a BS, a UE, or other equipment in a wireless communication system.

The invention claimed is:

1. A method of transmitting data by a transmitting device in a semantic-based wireless communication system, the method comprising:
    decomposing the data into semantic element values respectively corresponding to a plurality of semantic elements based on the plurality of semantic elements;
    performing first transmission including some semantic element values from among the semantic element values; and
    performing retransmission including at least one semantic element value other than the semantic element values provided in the first transmission from among the plurality of semantic element values based on reception of a retransmission request for the first transmission from a receiving device.

2. The method of claim 1, wherein the retransmission request includes information requesting the at least one semantic element value.

3. The method of claim 1, wherein the retransmission request includes information regarding a channel for the retransmission.

4. The method of claim 1, wherein the transmitting device includes a semantic decomposition layer, and
    wherein the decomposing of the data into the semantic element values is performed by the semantic decomposition layer.

5. The method of claim 1, further comprising negotiating the plurality of semantic elements with the receiving device.

6. A receiving device for receiving data in a semantic-based wireless communication system, the receiving device comprising:
- at least one transceiver;
- at least one processor; and
- at least one computer memory operably connected to the at least one processor and configured to store instructions that, when executed, cause the at least one processor to perform operations including:
- receiving, from a transmitting device, first transmission including semantic element values for some semantic elements from among a plurality of semantic elements;
- composing semantic data based on the semantic element values provided in the first transmission;
- calculating semantic correctness for the composed semantic data;
- transmitting a retransmission request for the first transmission based on the semantic correctness lower than a threshold; and
- receiving retransmission including a semantic element value for at least one semantic element other than the some semantic elements.

7. The receiving device of claim 6, wherein the retransmission request includes information requesting the at least one semantic element.

8. The receiving device of claim 6, wherein the retransmission request includes information regarding a channel for the retransmission.

9. The receiving device of claim 6, wherein the receiving device includes a semantic composition layer, and
wherein the semantic data is composed by the semantic composition layer.

10. The receiving device of claim 6, further comprising negotiating the plurality of semantic elements with the transmitting device.

11. A transmitting device for transmitting data in a semantic-based wireless communication system, the transmitting device comprising:
- at least one transceiver;
- at least one processor; and
- at least one computer memory operably connected to the at least one processor and configured to store instructions that, when executed, cause the at least one processor to perform operations including:
- decomposing the data into semantic element values respectively corresponding to a plurality of semantic elements based on the plurality of semantic elements;
- performing first transmission including some semantic element values from among the semantic element values; and
- performing retransmission including at least one semantic element value other than the semantic element values provided in the first transmission from among the plurality of semantic element values based on reception of a retransmission request for the first transmission from a receiving device.

* * * * *